United States Patent
Galant et al.

(10) Patent No.: US 9,792,951 B2
(45) Date of Patent: Oct. 17, 2017

(54) SYSTEMS AND METHODS FOR IDENTIFYING POTENTIALLY INTERESTING EVENTS IN EXTENDED RECORDINGS

(71) Applicant: Vieu Labs, Inc., Palo Alto, CA (US)

(72) Inventors: Yaron Galant, Palo Alto, CA (US); Ehud Chatow, Palo Alto, CA (US)

(73) Assignee: VIEU LABS, INC., Palo Alto, CA (US)

( * ) Notice: Subject to any disclaimer, the term of this patent is extended or adjusted under 35 U.S.C. 154(b) by 0 days.

(21) Appl. No.: 14/190,006

(22) Filed: Feb. 25, 2014

(65) Prior Publication Data

US 2014/0334796 A1   Nov. 13, 2014

Related U.S. Application Data

(60) Provisional application No. 61/820,813, filed on May 8, 2013.

(51) Int. Cl.
| | |
|---|---|
| *H04N 9/80* | (2006.01) |
| *G11B 27/031* | (2006.01) |
| *H04N 5/77* | (2006.01) |
| *G11B 27/28* | (2006.01) |
| *H04N 5/765* | (2006.01) |
| *H04N 9/82* | (2006.01) |

(52) U.S. Cl.
CPC .......... *G11B 27/031* (2013.01); *G11B 27/28* (2013.01); *H04N 5/772* (2013.01); *H04N 5/765* (2013.01); *H04N 9/8205* (2013.01)

(58) Field of Classification Search
CPC .. G11B 27/031; G11B 27/10; G06K 9/00711; G06K 9/00765; H04N 5/765

USPC ......................................................... 386/241
See application file for complete search history.

(56) References Cited

U.S. PATENT DOCUMENTS

| | | |
|---|---|---|
| 2002/0163577 A1 | 11/2002 | Myers |
| 2005/0169367 A1 | 8/2005 | Venetianer et al. |
| 2006/0227997 A1 | 10/2006 | Au et al. |
| 2006/0239645 A1 | 10/2006 | Curtner et al. |
| 2008/0298796 A1 | 12/2008 | Kuberka et al. |
| 2009/0144785 A1* | 6/2009 | Walker et al. ................ 725/105 |
| 2009/0213245 A1* | 8/2009 | Harper et al. ............. 348/231.3 |

(Continued)

OTHER PUBLICATIONS

International Application No. PCT/US2014/035703, International Search Report and Written Opinion mailed Sep. 25, 2014.

*Primary Examiner* — Thai Tran
*Assistant Examiner* — Jose Mesa
(74) *Attorney, Agent, or Firm* — Blakely, Sokoloff, Taylor & Zafman LLP

(57) ABSTRACT

A system may comprise a trigger creation module configured to provide a set of one or more trigger conditions, satisfaction of each trigger condition being based on sensor data to be received. A sensor interface module may be configured to receive actual sensor data from one or more sensors, the actual sensor data being generated contemporaneously with recording of an activity. A trigger satisfaction module may be configured to determine whether at least one trigger condition of the set of trigger conditions has been satisfied based on the actual sensor data. An event identification module may be configured to identify a potentially interesting event within the recording of the activity based on the satisfied at least one trigger condition.

21 Claims, 11 Drawing Sheets

(56) References Cited

U.S. PATENT DOCUMENTS

2009/0219411 A1    9/2009   Marman et al.
2010/0214408 A1    8/2010   McClure et al.
2012/0219271 A1*   8/2012   Vunic et al. ................. 386/278

* cited by examiner

SYSTEMS AND METHODS FOR IDENTIFYING POTENTIALLY INTERESTING EVENTS IN EXTENDED RECORDINGS

CROSS-REFERENCE TO RELATED APPLICATIONS

The present application claims priority to provisional U.S. Patent Application Ser. No. 61/820,813, filed May 8, 2013 and entitled "Video Analytics for Personalized Recommendations, Tagging and Broadcasting Based on Sensor Data and Machine Learning," the contents of which are hereby incorporated by reference herein.

TECHNICAL FIELD

The technical field relates to systems and methods to processing recordings. More particularly, the technical field relates to systems and methods for identifying potentially interesting events in recordings.

BACKGROUND

Portable cameras and wearable technology (e.g., portable and wearable cameras) have revolutionized recording of activities. For example, portable cameras have made it possible for cyclists to capture first-person perspectives of cycle rides. Portable cameras have also been used to capture unique aviation perspectives, record races, and record routine automotive driving. Portable cameras used by athletes, musicians, and spectators often capture first-person viewpoints of sporting events and concerts. As the convenience and capability of portable cameras improve, increasingly unique and intimate perspectives are being captured.

Similarly, wearable technology has enabled the proliferation of telemetry recorders. Fitness tracking, GPS, biometric information, and the like enable the incorporation of technology to acquire data on aspects of a person's daily life (e.g., quantified self).

In many situations, however, the length of recordings (i.e., footage) generated by portable cameras and/or sensors may be very long. People who record an activity often find it difficult to edit long recordings to find or highlight interesting or significant events. For instance, a recording of a bike ride may involve depictions of long stretches of the road. The depictions may appear boring or repetitive video content and may not include the drama or action that characterizes more interesting parts of the ride. Similarly, a recording of a plane flight, a car ride, or a sporting event (such as a baseball game) may depict scenes that are boring or repetitive. Manually searching through long recordings for interesting events may require an editor to scan all of the footage for the few interesting events that are worthy showing to others or storing in an edited recording. A person faced with searching and editing footage of an activity may find the task tedious or may choose not to undertake the task at all.

SUMMARY

A system may comprise a trigger creation module configured to provide a set of one or more trigger conditions, satisfaction of each trigger condition being based on sensor data to be received. A sensor interface module may be configured to receive actual sensor data from one or more sensors, the actual sensor data being generated contemporaneously with recording of an activity. A trigger satisfaction module may be configured to determine whether at least one trigger condition of the set of trigger conditions has been satisfied based on the actual sensor data. An event identification module may be configured to identify a potentially interesting event within the recording of the activity based on the satisfied at least one trigger condition.

In some embodiments, the trigger satisfaction module is configured to compare the actual sensor data to a sensor data threshold associated with the at least one trigger condition of the set of trigger conditions. The system may include a tagging module configured to tag a portion of the recording associated with the potentially interesting event. The system may include a sensor configuration module configured to activate the one or more sensors in response to the trigger creation module providing the set of the one or more trigger conditions.

In various embodiments, the system may include a context identification module configured to identify a context, wherein, the trigger creation module is configured to identify the set of one or more trigger conditions from a plurality of trigger conditions based at least in part on the context. In embodiments, the trigger satisfaction module may be configured to determine whether the trigger has been satisfied based on actual recording metadata. The actual recording metadata may comprise a pixel count of at least a portion of the recording of the activity.

In some embodiments, the sensor data to be received comprises one or more of: Global Positioning System (GPS) sensor data, compass data, accelerometer data, gyroscope data, biometric sensor data, thermometer data, pressure sensor data, RF data, Geiger counter data, and telemetry sensor data. The sensors may be incorporated into a mobile phone. The mobile phone may be wirelessly coupled to an activity recording device configured to take the recording of the activity.

In a method, a trigger including set of one or more trigger conditions may be provided, where satisfaction of each trigger condition is based on actual sensor data to be received. Actual sensor data may be received from one or more sensors, the sensor data being generated substantially contemporaneously with recording of an activity. It may be determined whether the at least one trigger condition of the set of trigger conditions has been satisfied based on the actual sensor data. A potentially interesting event may be identified within the recording of the activity based on the satisfied at least one trigger condition.

In some embodiments, determining whether the trigger has been satisfied comprises comparing the actual sensor data to at least one sensor data threshold associated with the at least one trigger condition of the set of trigger conditions. The method may include tagging a portion of the recording associated with the potentially interesting event.

In embodiments, the one or more sensors may be activated in response to the trigger creation module identifying the set of the one or more trigger conditions. In various embodiments, a context may be identified, wherein the set of one or more trigger conditions is provided at least in part on the context.

Determining whether the trigger has been satisfied may be based on actual recording metadata. The actual recording metadata may comprise a pixel count of at least a portion of the recording of the activity. In one example, the trigger may be satisfied by a ratio of low pixel count or pixel density in some areas of a frame in the recording and a higher pixel count in another portion of the frame or another portion of the recording.

In some embodiments, the sensor data to be received comprises one or more of: Global Positioning System (GPS) sensor data, compass data, accelerometer data, gyroscope data, biometric sensor data, thermometer data, pressure sensor data, RF data, Geiger counter data, and telemetry sensor data. The sensors may be incorporated into a mobile phone. The mobile phone may be wirelessly coupled to an activity recording device configured to take the recording of the activity.

A system may include: means for providing a set of one or more trigger conditions, satisfaction of each trigger condition being based on actual sensor data to be received; means for receiving actual sensor data from one or more sensors, the sensor data being generated substantially contemporaneously with recording of an activity; means for determining whether the at least one trigger condition of the set of trigger conditions has been satisfied based on the actual sensor data; and means for identifying a potentially interesting event within the recording of the activity based on the satisfied at least one trigger condition.

Other features and embodiments are apparent from the accompanying drawings and from the following detailed description.

DETAILED DESCRIPTION

Figure 1:
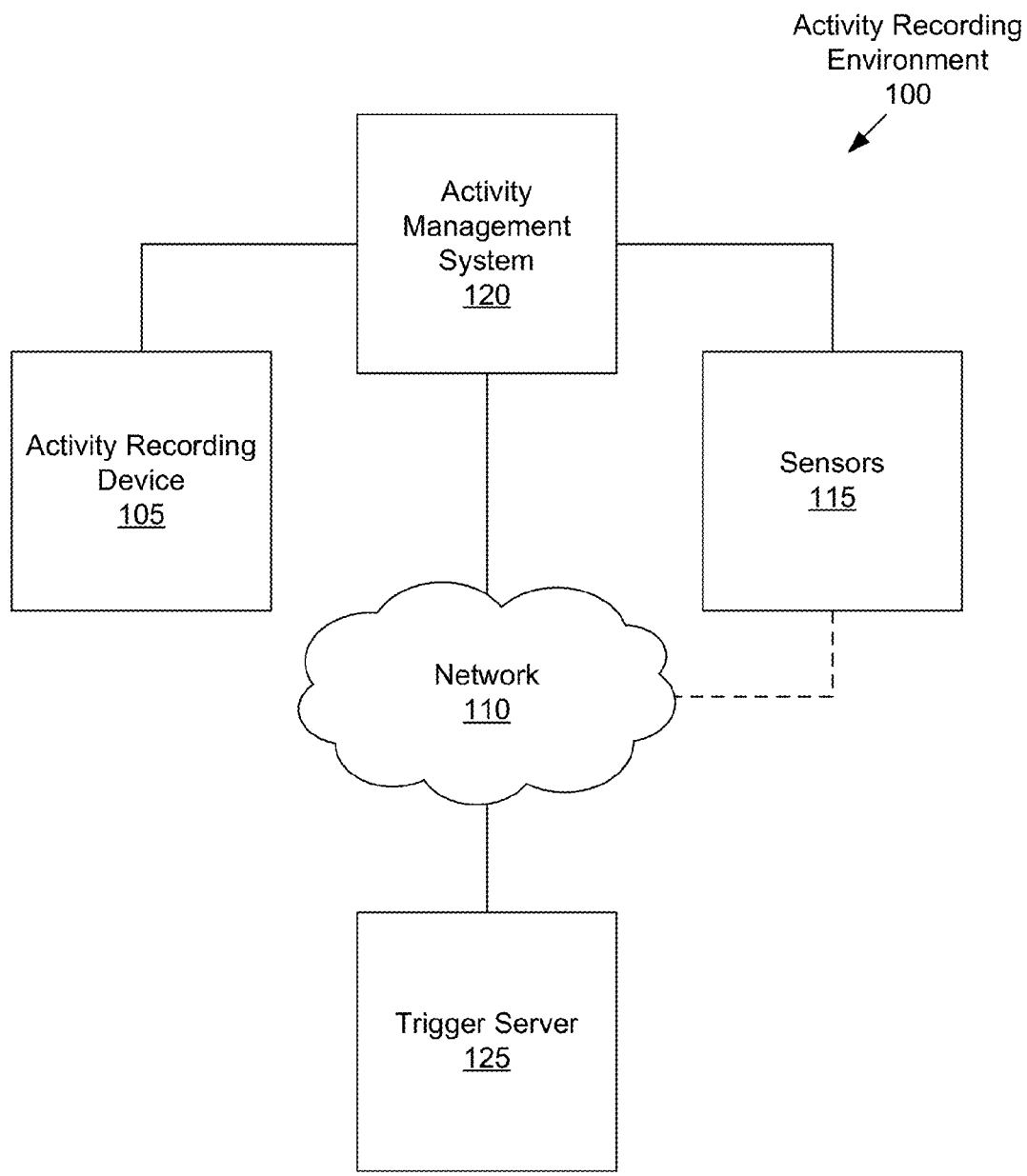
FIG. 1 depicts an exemplary activity recording environment, according to some embodiments.

FIG. 1 depicts an exemplary activity recording environment 100, according to some embodiments. The activity recording environment 100 may include an activity recording device 105, a network 110, sensors 115, an activity management system 120, and a trigger server 125. Various embodiments of the activity recording environment 100 identify portions of a recording (e.g., recorded video) that depict events of potential interest. In some embodiments, patterns of sensor data (e.g., measurements from sensors) are correlated with portions of the recording that depict events of potential interest. For example, when a person records a video, a timeline corresponding to the recording may be tagged with times when sensor data satisfies particular trigger conditions. The tags may be used to generate a highlight or mark portions of the recording to identify events of potential interest (e.g., video of bike jumps). Edited recordings (e.g., new recordings featuring highlights from the previous recording) may be generated based on the tags. The edited recording may further include annotations in some embodiments.

The activity recording device 105 may include a digital device having memory and a processor. The activity recording device 105 may include one or more of the elements of the digital device shown in FIG. 11. In various embodiments, the activity recording device 105 may include one or more of a wearable camera, a digital camera (e.g., a GOPRO Camera), a device having a web-camera, camcorder, video recorder, media player, tablet, smartphone, or the like. A recording is any video, audio, and/or other information that is captured. In some embodiments, the activity recording device 105 may generate the recording.

The activity recording device 105 may be capable of recording all or part of an activity. An "activity" may include any condition in which things are happening or being done. Examples of activities include cycling, flying a plane, driving a car, swimming, free diving or scuba diving, playing a sport, cooking, building an item, performing maintenance on an item, playing a musical instrument, giving instructions to do something, attending an concert, etc. An activity may optionally have a "context," which may include a framework of particular actions characteristic of that activity. Examples of contexts include a cycling context that provides a framework for capturing data (e.g., sensor data and/or recording metadata as discussed herein) related to cycling, an aviation context that provides a framework for capturing data related to flying, an automotive context that provides a framework for capturing data related to driving, or the like.

In some embodiments, the activity recording device 105 may provide recording metadata about recordings. Recording metadata includes information from the recording that indicates or assists in indicating an event in the recording of potential interest. For example, recording metadata may indicate a quick change in video suggestive of movement (e.g., a fall, a jump, meeting a friend, or stopping for a scenic view). In another example, recording metadata may include image data such as pixel counts (e.g., white pixel count, orange pixel count, and/or combination of red and green pixel count) in a portion of the captured by the video camera of the activity recording device 105 at a particular time or during a period of time. In some embodiments, recording metadata may include sound data such as volume or other attributes of sound being recorded by a microphone of the activity recording device 105 at a particular time or during a period of time.

In various embodiments, the activity recording device 105 may generate and/or provide recording metadata about recordings (i.e., recording metadata) while recording. In some embodiments, the activity recording device 105 may generate and/or provide recording metadata after recording has been completed or at any time (e.g., the recording metadata includes a pixel count of a portion of the recording which is calculated after the recording is recorded). Other examples of recording metadata include, but are not limited to, motion vectors, object detection, voice/phrase recognition, audio spectrum and intensity, and computed derivatives of other signals. In some embodiments, the activity recording device 105 may provide the recording metadata to the activity management system 120 and/or trigger server 125 at any time.

The activity recording device 105 may be coupled to the activity management system 120. In various embodiments, the activity recording device 105 may be coupled to the activity system 120 wirelessly (e.g., via a WiFi, Bluetooth, or cellular network) or over one or more wires (e.g., the activity recording device 105 may be a camera configured to communicate with the activity management system 120 via a USB or firewire cable). In some embodiments, the activity recording device 105 provides recording(s) and recording metadata to the activity management system 120. Those skilled in the art will appreciate that the activity recording device 105 may provide the recording and/or recording metadata to the activity management system 120 at any time. For example, the activity recording device 105 may not be in communication with the activity management system 120 and/or the trigger server 125 for periods of time during which the activity recording device 105 may record recordings and/or take sensor data. All or part of the recordings and/or sensor data may be provided to the activity management system 120 and/or the trigger server 125 when communication has been established and/or a quality of communication has been established (e.g., the activity recording device 105 may provide all or part of the sensor data if there is a wired or WiFi connection but not a cellular connection). In various embodiments, the activity recording device 105 provides recording(s) and/or recording metadata to any digital device (e.g., a digital device via the network 110).

The network 110 may include a computer network. The network 110 may include technologies such as Ethernet, 802.11x, worldwide interoperability for microwave access WiMAX, 2G, 3G, 4G, CDMA, GSM, LTE, digital subscriber line (DSL), and/or the like. The network 110 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or the like. The data exchanged over the network 110 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). The network 110 may be coupled to the activity management system 120 and the trigger server 125.

The sensors 115 may comprise any number of sensors. Any number of the sensors 115 may communicate with the activity management system 120 and/or a digital device (e.g., trigger server 125) via the network 110. The sensors 115 may include any number of devices capable of detecting, gathering, and/or providing measurements. Sensor data from sensors 115 may indicate but are not limited to locations, communication, timing, magnetism, orientations, acceleration, pressure, times, masses, temperatures, amounts of a substance, electric current, RF energy, radiation, luminous intensity, plane angles, solid angles, and/or quantities derived therefrom. In some embodiments, the sensors 115 may include one or more of: Global Positioning System (GPS) sensors, compasses, accelerometers, gyroscopes, biometric sensors, thermometers, pressure sensors, telemetry/cadence sensors, or the like. In various embodiments, any number of the sensors 115 may be implemented in any number of digital devices including, but not limited to, as a mobile phone, a wearable device (e.g., a wearable camera, a digital device that can record images), smart watch, tablet, a digital device that can capture biometric data, or the like.

Sensors 115 may generate measures, which, in various embodiments, related to an event in an activity. Events may include portions of an activity (e.g., a portion of an activity that is potentially interesting to watch or experience). There may be any number of events that are associated with any number of sensor measurements. Examples of events that may be associated with sensor measurements may be related to a bike ride may include, but not be limited to, a start of the ride, meetings with friends, specific uphill rides, specific downhill rides, and an end of the ride. Examples of events that may be associated with sensor measurements may be related to an airplane flight may include, but not be limited to, takeoff, viewing of landmarks, traversal through specific geographic regions, and a landing. Examples of events that may be associated with sensor measurements may be related to a car ride may include, but not be limited to, views of specific roads, views of the odometer, and traversal through specific geographic regions. In many embodiments, the existence of an event may depend on the context of the activity being performed.

Those skilled in the art will appreciate that sensor data may be generated by sensors 115 and/or the activity recording device 105 (e.g., information associated with all or part of the recording). In various embodiments, the sensor data may be assessed to determine whether one or more trigger conditions are satisfied which may indicate an event of potential interest. Based on the assessment, portions of the recording may be identified as having potentially captured an event of potential interest.

Although the sensors 115 are depicted as being coupled to the activity management system 120 and the trigger server 125, the sensors 115 may not be coupled to either the activity management system 120 or the trigger server 125. For example, the sensors 115 may collect sensor data and provide the collected sensor data (i.e., the actual sensor data) when communication is available (e.g., when the sensors 115 are capable of communicating with the trigger server 125 over the network 110 and/or when the sensors 115 are capable of communicating with the activity management system 120).

The activity management system 120 may include a digital device having memory and a processor configured to manage a recording (e.g., tag, flag, and/or annotate a recording from the activity recording device 105) of an activity. In various embodiments, the activity management system 120 may include one or more of a smartphone, a laptop computer, a computing tablet, a desktop computer, or any known or convenient digital device. The activity management system 120 may provide users an application or a portion of an application (e.g., a webpage displayed in a web browser) having the functionalities described herein.

In some embodiments, the activity management system 120 may include a personal computer coupled to the activity recording device 105 through a data port, a network cable, or a wireless network connection. In these embodiments, the activity management system 120 may receive the recording upon an upload of the recording. In other embodiments, the activity management system 120 may receive portions of the recording as these portions are recorded through push or other mechanisms.

The activity management system 120 may receive recording metadata from the activity recording device 105 and may receive sensor data from the sensors 115. The recording metadata and/or sensor data may be utilized by the activity management system 120 and/or the trigger server 125 to identify events of potential interest within a recording. Although recording metadata may be described as being provided from the activity recording device 105 and the sensor data may be described as being provided from the sensors 115 herein, the recording metadata may be considered, in some embodiments, as sensor data.

In some embodiments, the activity management system 120 may receive or generate a context for a recording (e.g., a context for a recording being generated by the activity recording device 105). The context may identify the type of activity being recorded (e.g., skiing, flying, surfing, racing, or the like). The activity management system 120 may provide the context to the trigger server 125.

The activity management system 120 may receive from the trigger server 125 tags in a timeline to mark positions and/or portions within a recording of the activity recording device 105. In some embodiments, tags and/or other data from the trigger server 125 may be based on whether recording metadata and/or sensor data meet trigger conditions related to the activity. "Trigger conditions" may include a specific combination of received sensor data and/or recording metadata that indicate that a particular event associated with a recording is occurring or has occurred.

In various embodiments, a trigger condition may comprise one or more predetermined sensor data thresholds. In one example, a sensor data threshold is a value or range. When actual sensor data is received from a sensor 115, the actual sensor data may be compared to the predetermined sensor data threshold to identify a time, a duration, a point in the recording, and/or a period in the recording that may capture an event of potential interest.

For example, actual sensor data may indicate that the user or sensor 115 is quickly accelerating. The actual sensor data may be compared to an acceleration threshold (e.g., a threshold value indicating a value of acceleration and/or a threshold value indicating a change in acceleration). In this example, if the actual sensor data exceeds the acceleration threshold, a trigger condition may be satisfied and an associated point or portion in the recording may be flagged as capturing an event of potential interest. Those skilled in the art will appreciate that a trigger condition may be satisfied if actual sensor data exceeds a threshold, falls below a threshold, equals a threshold, or the like. In some embodiments, the threshold may represent a discrete value rather than a range.

A trigger condition may include any number of trigger conditions. One or more trigger conditions may include any number of predetermined sensor data thresholds associated with any number of different types of sensor data (e.g., telemetry, acceleration, sounds, or the like). In some embodiments, satisfaction of a trigger condition may require different types of sensor data exceed or fall below one or more different sensor data thresholds.

In some embodiments, one or more trigger conditions may include a plurality of different types of actual sensor data as well as different values of the actual sensor data. In one example, a trigger condition may include a pattern of actual sensor data from different sensors. In one example, sensor data including measurements that are equal to or exceed a threshold of pixel density of orange coloring, time of day, and a geographic location may satisfy a trigger condition which may suggest a sunset.

In another example, one or more trigger conditions may include a function of the same type of sensor data and/or a function of different types of sensor data. For example, a trigger condition may include a series of changes in acceleration and/or velocity (e.g., a trigger is satisfied upon detection of specific changes in acceleration). In another example, a trigger condition may include a specific combination of sensor measurements of different types. In some embodiments, one or more different sensor measurements of different types may be analyzed (e.g., fed into a neural net) to determine if a trigger has been satisfied (e.g., a threshold is compared to an output of a function of different sensor measurements and/or measurements from different types of sensors).

In some embodiments, the activity management system 120 may flag, mark, or annotate a recording (e.g., a recording that includes one or more portions of an extended recording) that may identify events signified by the recording metadata from the activity recording device 105 and/or the sensor data from the sensors 115. The activity management system 120 may also generate an edited recording including one or more of the identified events. For example, the edited recording of the activity may reflect portions of the activity that are important to a person recording the activity and/or an audience viewing the recording. In one example, the edited recording comprises a concatenated string of events.

In various embodiments, the edited recording may include one or more enhancements. For example, enhancements may include viewpoints from people other than the person who recorded the footage of the activity. Moreover, enhancements may include video from multiple viewpoints (e.g., from different recordings), participant and/or non-participant viewpoints, images, map data, text, transitions, shapes, images, and other data related to events. The enhancements may also include sound, audio, or effects related to a particular event.

The activity management system 120 may be coupled to the activity recording device 105, the network 110, and the sensors 115. FIGS. 5-9 show the activity management system 120 and various embodiments of its operation in further detail.

The trigger server 125 may include a digital device having memory and a processor configured to tag events in a recording. In various embodiments, events that are potentially interesting in the recording correspond to sensor data captured by the sensors 115 and/or recording metadata from the activity recording device 105. The trigger server 125 may receive all or some sensor data and determine if trigger condition(s) are satisfied. The trigger server 125 may determine a timeline that correlates and/or is synchronized with the recording. The trigger server 125 may associate a tag, flag, and/or annotation with the timeline based on the time that the trigger condition(s) are satisfied. The trigger server 125 may provide the timeline to the activity management system 120 which may correlate the tag, flag, and/or annotation with the recording (e.g., the timeline from the trigger server 125 may be correlated with the time of the recording). The tagged, flagged, and/or annotated portion of the recording may indicate an event of potential interest.

In various embodiments, the activity management system 120 may include, for example, one or more of a laptop computer, a computing tablet, and a desktop computer, a dedicated server, and any known or convenient digital device. In some embodiments, the trigger server 125 may be managed by the activity management system 120.

Figure 2:
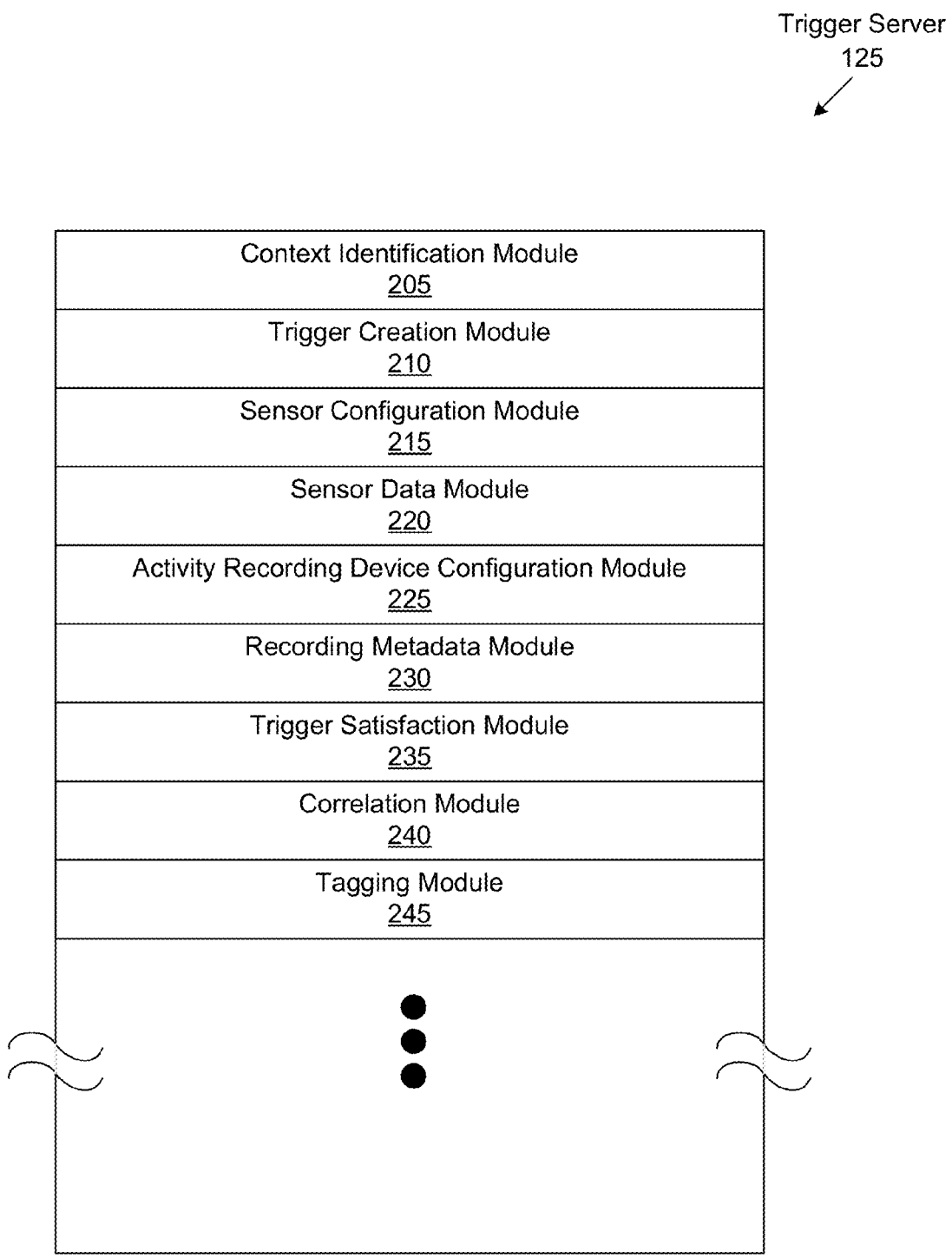
FIG. 2 depicts an exemplary trigger server, according to some embodiments.
Figure 3:
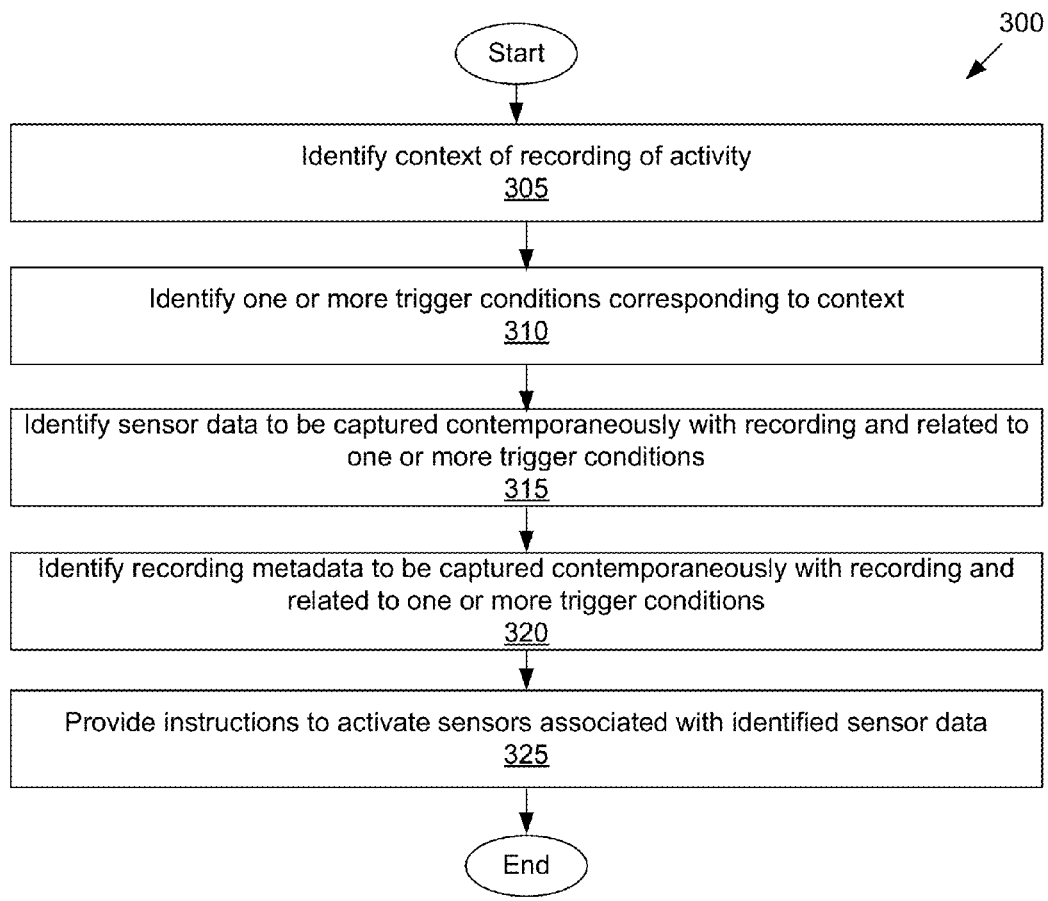
FIG. 3 depicts a flowchart of an exemplary method for activating sensors associated with identified sensor data, according to some embodiments. 9
Figure 4:
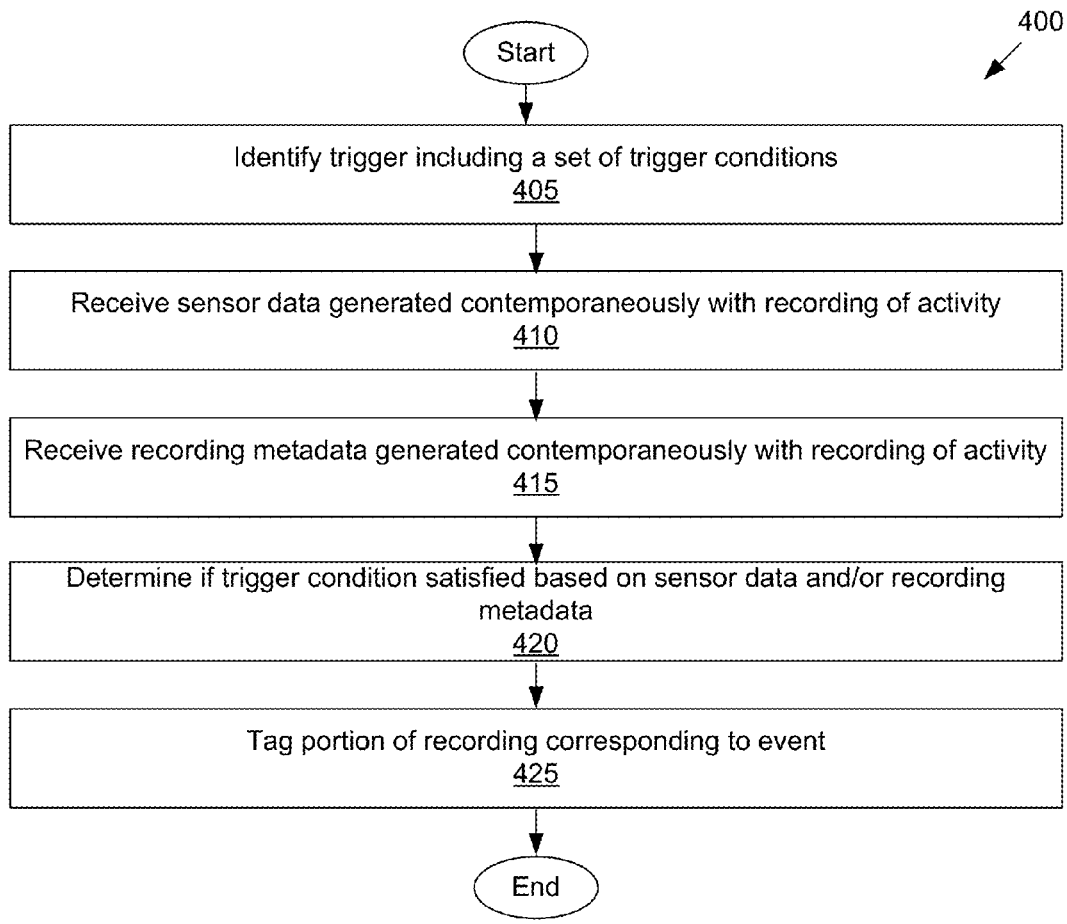
FIG. 4 depicts a flowchart of an exemplary method for tagging events of a recording, according to some embodiments.

The trigger server 125 may provide instructions to the sensors 115 and/or the activity management system 120 to activate, deactivate, control, and/or calibrate particular sensors. For example, particular sensors may be activated for a particular context (e.g., activate the accelerator sensor for a context of "skiing"). The trigger server 125 may also receive from the activity management system 120 a context of a recording of an activity, recording metadata taken contemporaneously with the recording, and sensor data taken contemporaneously with the recording. The trigger server 125 may identify whether the recording metadata and/or the sensor data correspond to trigger conditions that mark events in the recording. In some embodiments, the trigger server 125 may tag portions of a timeline corresponding to the time events are likely to occur in the recording. The trigger server 125 may also provide the tags to the activity management system 120. The trigger server 125 may be coupled to the network 110. FIGS. 2-4 show the trigger server 125 and various embodiments of its operation in further detail.

It is noted that in various embodiments, the trigger server 125 may instruct the sensors 115 and/or the activity management system 120 to activate all relevant sensors without regard for the context of an activity. In these embodiments, the trigger server 125 may nonetheless identify sensor data and/or recording metadata, determine whether the sensor data and/or recording metadata correspond to trigger conditions, and tag portions of a timeline corresponding to the time events are likely to occur in the recording.

FIG. 1 shows the activity recording device coupled to the activity management system 120. However, in various embodiments the activity recording device 105 may be coupled to the network 110, the sensors 115, the trigger server 125, or some combination thereof. Further, in some embodiments, the activity recording device 105 may be included inside the activity management system 120, or may be contained within a device containing the activity management system 120. It is further noted that in some embodiments, portions of the network 110 may couple the activity recording device 105 and the sensors 115 directly to one another. Moreover, the activity recording device 105 and the sensors 115 may also be coupled to each other through other ways, such as through data ports, data connections, Bluetooth connections, etc. Further, in some embodiments, the activity recording device 105 may be coupled directly to the network 110, through a connection such a wireless network connection. In particular embodiments, the sensors 115 may be coupled directly to the network 110, through a connection such a wireless network connection.

Additionally, though FIG. 1 shows a single activity recording device 105, it is noted various embodiments may use multiple instances of the activity recording device 105. The multiple instances of the activity recording device 105 may be used to capture multiple perspectives of an activity, whether the multiple perspectives are taken from one person or from more than one person. Moreover, though FIG. 1 shows the trigger server 125 and the activity management system 120 coupled via the network 110, it is noted in various embodiments, the trigger server 125 and the activity management system 120 may reside on the same device.

FIG. 2 shows an exemplary trigger server 125, according to some embodiments. The trigger server 125 may include a context identification module 205, a trigger creation module 210, a sensor configuration module 215, a sensor data module 220, an activity recording device configuration module 225, a recording metadata module 230, a trigger satisfaction module 235, a timeline correlation module 240, and a tagging module 245.

The context identification module 205 may contain hardware, software, and/or firmware operative to identify a context of an activity to be recorded. The context identification module 205 may receive and/or determine a context. In some embodiments, the context may be based on information a user has entered for an activity. In various embodiments, the context identification module 205 may determine a context based on information from the activity recording device 105 and/or the sensors 115 (shown in FIG. 1). For instance, the context may be identified based on the speed of the sensors 115 (as indicated from sensor data), the tilt of the sensors 115 (as indicated from sensor data), biometric data captured by the sensors 115, pixel count changes from recording metadata of the activity recording device 105, or the like.

For example, the context identification module 205 may identify different contexts based on sensor data which includes sensor measurements. Different contexts may be determined based on one or more different sensor measurements. In some embodiments, different contexts may be based on expected sensor data. The context identification module 205 may receive sensor data and retrieve a context from a plurality of contexts based on the received sensor data. For example, the context identification module 205 may receive sensor data and retrieve a context based on any number of measurements of the sensor data being less than, equal, or greater than any number of predetermined sensor thresholds. Any number of the sensor thresholds may be provided by a user, administrator, group of users (e.g., aggregate number of users), or the like.

For example, the context identification module 205 may determine the context of an activity by receiving the sensor data. The context identification module 205 may determine the context of an activity as "skiing" based on GPS location (e.g., Vale), acceleration, velocity, orientation, temperature, sound, and/or the like. The sensor data may, in some embodiments, include measurements that identify changes (e.g., a sudden drop in acceleration). In various embodiments, the context identification module 205 may determine changes in measurements based on previously received sensor data.

Those skilled in the art will appreciate that any number of general contexts may be provided to utilize triggers that may be common. The general contexts may be refined or replaced upon the user providing more information on context and/or upon receiving additional sensor data.

The trigger creation module 210 may contain hardware, software, and/or firmware operative to establish a number of triggers. A trigger may identify and/or may be associated with any number of trigger conditions. Trigger conditions identify a circumstance or occurrence that may be satisfied or partially satisfied by sensor data (e.g., measurements from any number of sensors) and/or recording metadata from an activity recording device 105.

The trigger creation module 210 may determine trigger conditions which may be correlated with a potentially interesting event of an activity. For example, the trigger creation module 210 may identify measurements from sensor data and/or recording metadata that would correlate with events of potential interest within of one or more activities. The trigger creation engine 207 may create one or more trigger conditions for any number of events. The trigger conditions may or may not be context-specific.

For example, interesting events of a biking activity may include biking near scenic overlooks, downhill riding, and moments of high velocity. The trigger creation module 210 may generate trigger conditions based on GPS or other location information, gyroscope information, and velocity information (e.g., from an accelerometer or other sensor). Each trigger condition may identify one or more potentially interesting activities.

Those skilled in the art will appreciate that trigger conditions may or may not be context dependent. For example, one acceleration measurement for an accelerometer may indicate a high rate of speed in the context of a marathon but may not indicate a high rate of speed in cycling. As such, all or part of trigger conditions for different potentially interesting activities of different events may be similar or dissimilar.

In some embodiments, a user may select, identify, and/or provide trigger conditions that may identify events of potential interest to the user. For example, a user may provide one or more trigger conditions that may indicate an event of personal interest but not events of interest to others. As discussed herein, trigger conditions may/or may not be context dependent. In various embodiments, a user may select, identify, and/or provide a trigger condition that indicates an event of potential interest when the user manually provides a signal and/or provides verbal commands. In some embodiments, sensor data may include the manually provided signal and/or verbal commands.

The sensor configuration module 215 may contain hardware, software, and/or firmware operative to activate particular ones of the sensors 115 (shown in FIG. 1). More specifically, in various embodiments, the sensor configuration module 215 may provide instructions to activate, deactivate, receive information from, and/or calibrate GPS sensors, compasses, accelerometers, gyroscopes, biometric sensors, thermometers, pressure sensors, telemetry/cadence sensors, etc. The instructions to particular sensors may be based, at least in part, on an identified context.

The sensor data module 220 may contain hardware, software, and/or firmware operative to receive sensor data from the sensors 115 (shown in FIG. 1). The sensor data may be provided to the sensor data module 220 at predetermined times or at intervals. The sensor data may also be provided to the sensor data module 220 as the sensor data is generated at the time of recording (e.g., the sensor data is generated contemporaneous with recording), or may be provided upon upload of a recording to the activity management system 120. In embodiments, the sensor data module 220 may provide the sensor data to the trigger satisfaction module 235.

The activity recording device configuration module 225 may contain hardware, software, and/or firmware operative to configure the activity recording device 105 (shown in FIG. 1) to provide various types of recording metadata. In some embodiments, the activity recording device configuration module 225 may instruct the activity recording device 105 (or any digital device with access to all or part of the recording) to determine from the recording and provide, for example, a white pixel count, an orange pixel count, video granularity, motion vector information, object detection information, voice/phrase recognition, audio spectrum and intensity information, computed derivatives of other signals or the like. Instructions to configure the activity recording device 105 to provide various types of recording metadata may be based, at least in part, on an identified context. The activity recording device configuration module 225 may be configured to instruct the activity recording device 105 to provide one or more different types of information, to activate, to deactivate, to be calibrated, to be controlled, or the like.

The recording metadata module 230 may contain hardware, software, and/or firmware operative to receive recording metadata from the activity recording device 105 (shown in FIG. 1). The activity recording device 105 may provide recording metadata to the recording metadata module 230 at predetermined times, intervals, when the recording metadata is available, and/or when network connectivity is available to the activity recording device 105. In some embodiments, the recording metadata may also be provided to the recording metadata module 230 while recording (e.g., recording metadata is generated contemporaneous with recording) when the recording metadata is captured, or may be provided upon upload of a recording to the activity management system 120. In embodiments, the recording metadata module 230 may provide the recording metadata to the trigger satisfaction module 235. Those skilled in the art will appreciate that the activity management system 120 may generate the recording metadata after or during recording. For example, the activity management system 120 may scan a previously stored recording to generate recording metadata. Similarly, measurements from sensors 115 may be previously stored and scanned to provide one or more sensor signals based on the scanning of the previously stored measurements.

In some embodiments, the recording the activity recording device 105 may record and store a recording. Subsequently, the activity recording device 105 and/or the activity management system 120 may scan all or a portion of the recording to generate recording metadata. For example, the activity recording device 105 may scan a portion of the recording to identify a pixel count and a pixel count density (e.g., in a portion of a video frame) which may suggest an image (e.g., sunset) or other event. In another example, the activity recording device 105 may scan all or a portion of the recording for motion vectors, object detection, face recognition, or the like.

Those skilled in the art will appreciate that the trigger server 125 and/or the activity management system 120 may command a scan of all or a portion of the recording based on one or more different sensor readings (e.g., based on the actual sensor data). For example, the trigger server 125 may command a scan of a recording at a specific recorded time based on location (e.g., GPS data), sounds from people such as cheering (e.g., audio data), and/or time of day (e.g., clock data). The scan of the recording may be initiated based on any one or combination of sensor measurements. The scan of the recording may be initiated based on a specific pattern in one sensor's measurements or a pattern of the sensor data from a plurality of sensors. In some embodiments, the scan of the recording may be initiated based on context and/or predetermined intervals (e.g., without any sensor information).

The trigger satisfaction module 235 may contain hardware, software, and/or firmware operative to determine whether sensor data satisfies established trigger conditions. In various embodiments, the trigger satisfaction module 235 may retrieve one or more triggers from a plurality of triggers. The trigger satisfaction module 235 may, in some embodiments, retrieve any number of triggers based on context (e.g., particular triggers may be associated with trigger conditions that, when satisfied by particular receive sensor data, indicate that a potentially interesting event may have been recorded).

In some embodiments, the trigger satisfaction module 235 may determine whether sensor data (e.g., actual sensor data received from sensors 115 by the sensor data module 220) matches with sensor data threshold(s) and/or or recording metadata threshold(s) for a potentially interesting event relating to a particular context and/or activity. For instance, for a cycling activity, the trigger satisfaction module 235 may determine whether received actual sensor data contains sensor measurements related to speed, tilt, and GPS data sufficient to satisfy any number of trigger condition(s) (the trigger condition(s) being potentially generated by the trigger creation module 210). In another example, for the cycling activity, the trigger satisfaction module 235 may determine whether orange pixel counts in recording metadata satisfy a trigger condition (e.g., the orange pixel counts may indicate or suggest a recording of a sunset which may be a potentially interesting event during the activity). In various embodiments, the trigger satisfaction module 235 may provide an indication whether trigger conditions were satisfied to other modules of the trigger server 125 and/or other digital devices.

The correlation module 240 may contain hardware, software, and/or firmware operative to indicate when trigger conditions were satisfied for a given recording. In some embodiments, the correlation module 240 may maintain a timeline corresponding to the recording. The correlation module 240 may, in some embodiments, enter a timestamp into the timeline at the approximate time of each trigger condition that has been satisfied. The correlation module 240 may provide the timeline, including the marked times of each satisfied trigger condition, to the tagging module 245.

The timeline with the corresponding timestamps may be utilized to identify any number of times during the corresponding recording that a potentially interesting event may have occurred.

The tagging module 245 may contain hardware, software, and/or firmware operative to receive the timeline from the correlation module 240. The tagging module 240 may also contain hardware, software, and/or firmware operative to provide tags corresponding to each time stamp in the timeline. In various embodiments, the tagging module 240 may provide tags to the activity management system 120 (shown in FIG. 1) to mark the times of potentially interesting events in a recording.

In various embodiments, the tagging module 245 may add additional tags, flags, and/or annotations associated with one or more time stamps from the correlation module 240. Those skilled in the art will appreciate that a potentially interesting event may have occurred before, during, or after the trigger satisfaction module 235 indicates a trigger is satisfied. The tagging module 245 may add a flag at a predetermined or default time before a time stamp and/or add a flag at a predetermined or default time after a time stamp. As a result, a portion of a recording may be flagged to identify a potential duration of a potentially interesting event. This may allow for additional confidence that a larger portion or an entire potentially interesting event has been indicated in the recording.

In various embodiments, the tagging module 245 may add tags at different intervals before and/or after a time stamp depending on the trigger that is satisfied and/or a context. In some embodiments, when the trigger creation module 210 creates trigger conditions, the tagging module 245 may determine or receive information indicating when and where additional tags should be added with respect to the time stamp.

Although FIG. 2 shows the context identification module 205, it is noted that various embodiments may omit the context identification module 205. More specifically, in some embodiments, the sensor configuration module 210 may configure all of the sensors 115 to provide sensor data during the recording. The activity recording device configuration module 225 may similarly configure the activity recording device 105 to provide all recording metadata during the recording. Based on this sensor data and/or recording metadata, the trigger satisfaction module 235, the correlation module 240, and the tagging module 245 may operate as discussed herein.

FIG. 3 depicts a flowchart 300 of an exemplary method for activating sensors associated with identified sensor data, according to some embodiments. The flowchart 300 is discussed in conjunction with the trigger server 125 shown in FIG. 2.

In step 305, the context identification module 205 may identify a context of a recording of an activity. In some embodiments, the context may include a user-specified context, that is, a context a user has manually entered for an activity (e.g., via an interface or website in communication with the context identification module 205). In various embodiments, the context may include a context identified based on the configuration of the activity recording device 105. In particular embodiments, the context may include a context identified based on how the sensors 115 are behaving. For instance, the context may include a context identified based on the speed, the tilt, biometric data, or the like of the sensors 115 and/or pixel count changes recorded by the activity recording device(s) 105. In certain embodiments, the context identification module 205 may receive a context identified based on self-identification by the activity recording device 105. The context identification module 205 may provide the identified context to the trigger satisfaction module 235.

In step 310, the trigger creation module 210 may identify one or more trigger conditions corresponding to the context. In various embodiments, the trigger creation module 210 may generate and/or identify one or more trigger conditions prior to receiving a context. For example, the trigger creation module 210 may be preconfigured to identify different trigger conditions that may indicate a potentially interesting event in any number of contexts.

In some embodiments, the trigger creation module 210 may select any number of trigger conditions from a plurality of previously configured trigger conditions based on a received context. For example, the trigger creation module 210 may receive a context and, based on the context, select a subset of trigger conditions from a previously generated set of trigger conditions. The selected subset of trigger conditions may be previously associated with the context. Those skilled in the art will appreciate that a trigger condition may be associated with any number of contexts and/or may be selected as being indicative of a potentially interesting event without any context.

In step 315, the sensor configuration module 215 may identify sensor data to be captured contemporaneously with the recording. In some embodiments, the sensor configuration module 215 may identify sensor data to be captured from previously recorded sensor data. In some embodiments, the sensor configuration module 215 may identify sensors based on the selected trigger condition and/or context (e.g., where the sensor data is related to the one or more trigger conditions). In various embodiments, the sensor configuration module 215 may identify sensor and/or sensor data related to a context and may provide instructions to sensors based on the identified sensor and/or sensor data. For example, the sensor configuration module 215 may identify configurations of one or more sensor(s) relating to various contexts, including: cycling, running, walking, flying, driving, or the like.

In some embodiments, the identified sensor data may be related to potentially interesting events associated with an activity represented or associated by the context. For instance, the sensor configuration module 215 may generate and/or provide sensor data relating to: a bumpy road, a steep and/or remarkable climb (e.g., category 2.1 climb), measures of a participant's performance (speed, etc.), tight turns, whether a participant is overtaking or being overtaken by another, whether the participant is approaching or at a finish line of a race, whether a participant has crashed, etc. All or some of the sensor data may satisfy any number of trigger conditions identified by a trigger which may indicate that a potentially interesting event may be recorded.

In another example, for trigger conditions related to an aviation context, the sensor configuration module 215 may generate and/or provide sensor data relating to: takeoff, turbulence, abrupt changes in elevation, acceleration, direction altitude, and/or attitude, whether a participant is entering and/or leaving an airspace, whether a participant has deviated from a flight plan, etc. As yet another example, for trigger conditions related to an automotive context, the sensor configuration module 215 may generate and/or provide sensor data relating to: lane changes, speeds, safe spacing from other drivers, tired drivers (through biometric data), acceleration, whether a car is wasting or saving fuel, etc. The sensor configuration module 215 may generate and/or provide sensor data relating to: known and/or predefined waypoints and/or segments, portions of an ascent or descent, portions of a scenic route, portions of a route marked by other people, whether a participant has crossed paths with other users, etc.

In step 320, the activity recording device configuration module 225 may identify a type of recording metadata to be captured contemporaneously with the recording, where the recording metadata is related to the one or more trigger conditions. In some embodiments, the activity recording device configuration module 225 may identify a type of recording metadata to be captured from a previously stored recording. For example, a trigger may be retrieved based on the context of an activity that is or will be recorded. The trigger may be associated with any number of trigger conditions. One or more of the trigger conditions may be satisfied, for example, by a type of recording metadata (e.g., a number of orange pixels that are recorded). The activity recording device configuration module 225 may provide instructions to one or more sensors and/or the sensors 115 to generate and/or provide the desired recording metadata.

In step 325, the sensor configuration module 215 may provide instructions to activate, retrieve, calibrate, and/or control information from sensors (e.g., activate or retrieve information from sensors 115) associated with the identified sensor data. For example, the sensor configuration module 215 may provide instructions to activate GPS sensors, compasses, accelerometers, gyroscopes, biometric sensors, thermometers, pressure sensors, telemetry/cadence sensors, or the like. The instructions may correspond to the sensor data to be captured contemporaneously with the recording.

FIG. 4 depicts a flowchart 400 of an exemplary method for tagging events of a recording, according to some embodiments. The flowchart 400 is discussed in conjunction with the trigger server 125, shown in FIG. 2.

In step 405, the trigger satisfaction module 235 may retrieve a trigger associated with a context, retrieve a trigger identified by the user, or determine a trigger (e.g., default and/or based on at least some information from sensors 115). The trigger may be associated with one or more trigger conditions. The trigger satisfaction module 235 may determine if one or more trigger conditions associated with any number of triggers is satisfied based on actual sensor data and/or recording metadata. In some embodiments, satisfaction of trigger conditions may be based on sensor data received from the sensors 115 and/or recording metadata received from the activity recording device 105.

In step 410, the sensor data module 220 receives sensor data from the sensors 115 generated contemporaneously with the recording of an activity. The sensor data may be based on how the sensors 115 are calibrated, controlled, or activated (e.g., by the sensor configuration module 215) for a given context. For instance, for a cycling activity, the trigger satisfaction module 235 may determine that a trigger condition is satisfied when the sensor data module 220 receives actual sensor data related to combinations of speed, tilt, and GPS data. Those skilled in the art will appreciate that actual sensor data may contain values associated with a measurement.

A trigger condition may include any number of thresholds which may indicate that the trigger condition is partially or completely satisfied. For example, a trigger condition may include a speed threshold and a tilt threshold. If the sensor data module 220 receives a value associated with speed that is greater than or equal to the speed threshold and if the sensor data module 220 receives a value associated with a tilt that is greater than or equal to the tilt threshold, then the trigger condition is satisfied.

In step 415, the recording metadata module 230 may receive recording metadata from the activity recording device 105 generated contemporaneously with the recording of the activity. The recording metadata may be based on how the activity recording device 105 is configured for a particular context. For example, for a cycling activity, recording metadata module 230 may receive pixel counts of various colors (e.g., white, orange, etc.) in recording metadata.

In step 420, the trigger satisfaction module 235 may determine if any number of trigger conditions have been satisfied based on the received sensor data (i.e., the actual sensor data) and/or the recording metadata. In some embodiments, the trigger satisfaction module 235 may compare the received sensor data with one or more thresholds of a relevant trigger condition. The trigger satisfaction module 235 may also compare the recording metadata with one or more thresholds of a relevant trigger condition. For example, the trigger satisfaction module 235 may determine if combinations of speed, tilt, and GPS data satisfied one or more trigger conditions for cycling (e.g., going uphill, going downhill, sprinting, starting a course, and/or ending a course). As another example, the trigger satisfaction module 235 may determine if recording metadata satisfied or partially satisfied one or more trigger conditions for cycling (e.g., whether orange pixel counts indicated a sunset).

In step 425, the tagging module 245 may tag a portion of a recording corresponding to the event of potential interest based on the satisfaction of any number of trigger conditions. In various embodiments, the tagging module 245 may obtain a timestamp of each satisfaction of a trigger condition from the correlation module 240. The tagging module 245 may associate timestamps received from the correlation module 240 with any number of tags. In various embodiments, the tagging module 240 may provide the tags to the activity management system 120.

Figure 5:
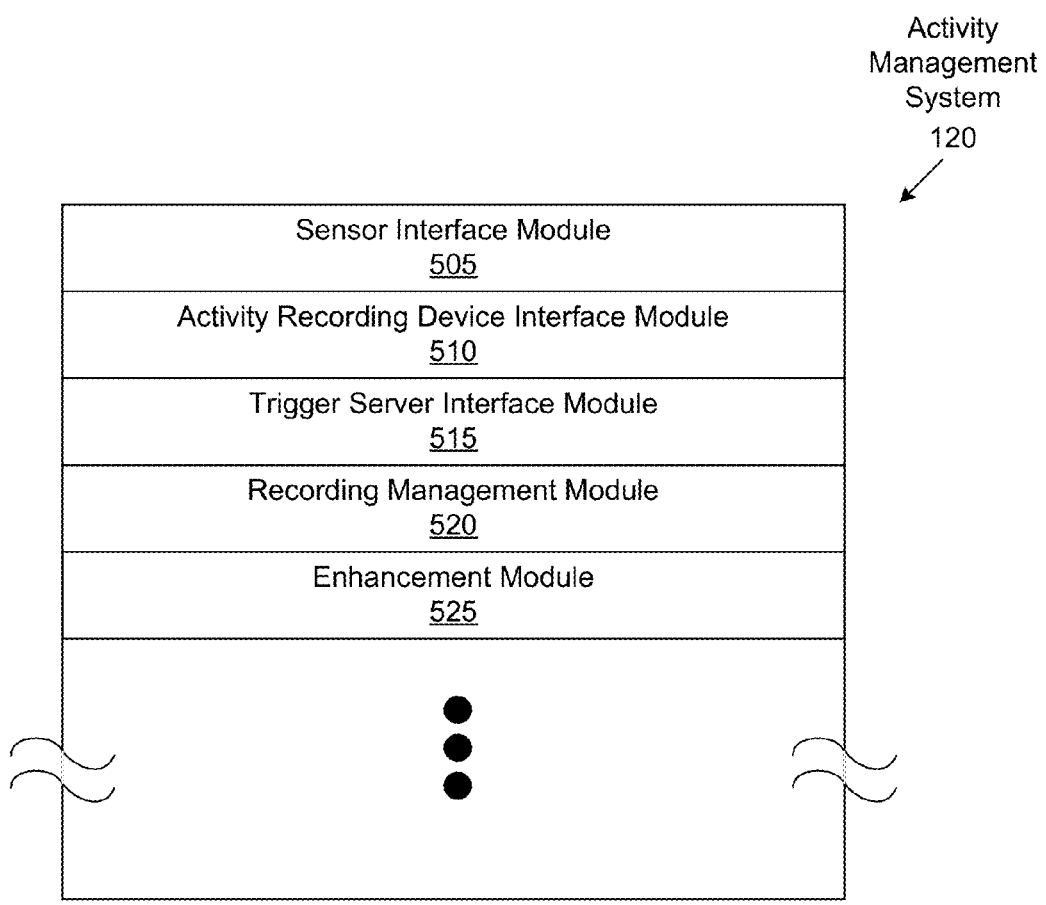
FIG. 5 depicts an exemplary activity management system, according to some embodiments.

FIG. 5 depicts an exemplary activity management system 120, according to some embodiments. The activity management system 120 may include a sensor interface module 505, an activity recording device interface module 510, a trigger server interface module 515, a recording management module 520, and an enhancement module 525. In some embodiments, the activity management system 120 is local to the activity recording device 105. For example, the activity management system 120 may include a user's desktop personal computer which is coupled to a user's video recorder (e.g., the activity recording device 105). In various embodiments, all or part of the activity management system 120 is remote to the user and/or the activity recording device 105 (e.g., the activity recording device 105 may provide all or some of the recording to the activity management system 120 across a network).

In one example, the activity management system 120 may comprise hardware and/or software that receives a recording (e.g., from the activity recording device 105) as well as the timeline and/or flags from the trigger server 125 (e.g., from the tagging module 245). The activity management system 120 may be utilized to flag, annotate, or otherwise associate data with the recording based on the timeline and/or flags. In some embodiments, the user may utilize the altered recording to view portions of the recording associated with the timeline, flags, or annotations to view events of likely interest that occurred during an activity. The user may also generate highlight video based on the altered recording. The highlight video may include portions of the altered recording. In some embodiments, portions of the altered recording may be shared with others (e.g., via vine, email, twitter, SMS text message, Flickr, Facebook, LinkedIn or the like). Portions included in the highlight video may be based on the timeline, flags, and/or annotations.

Figure 6:
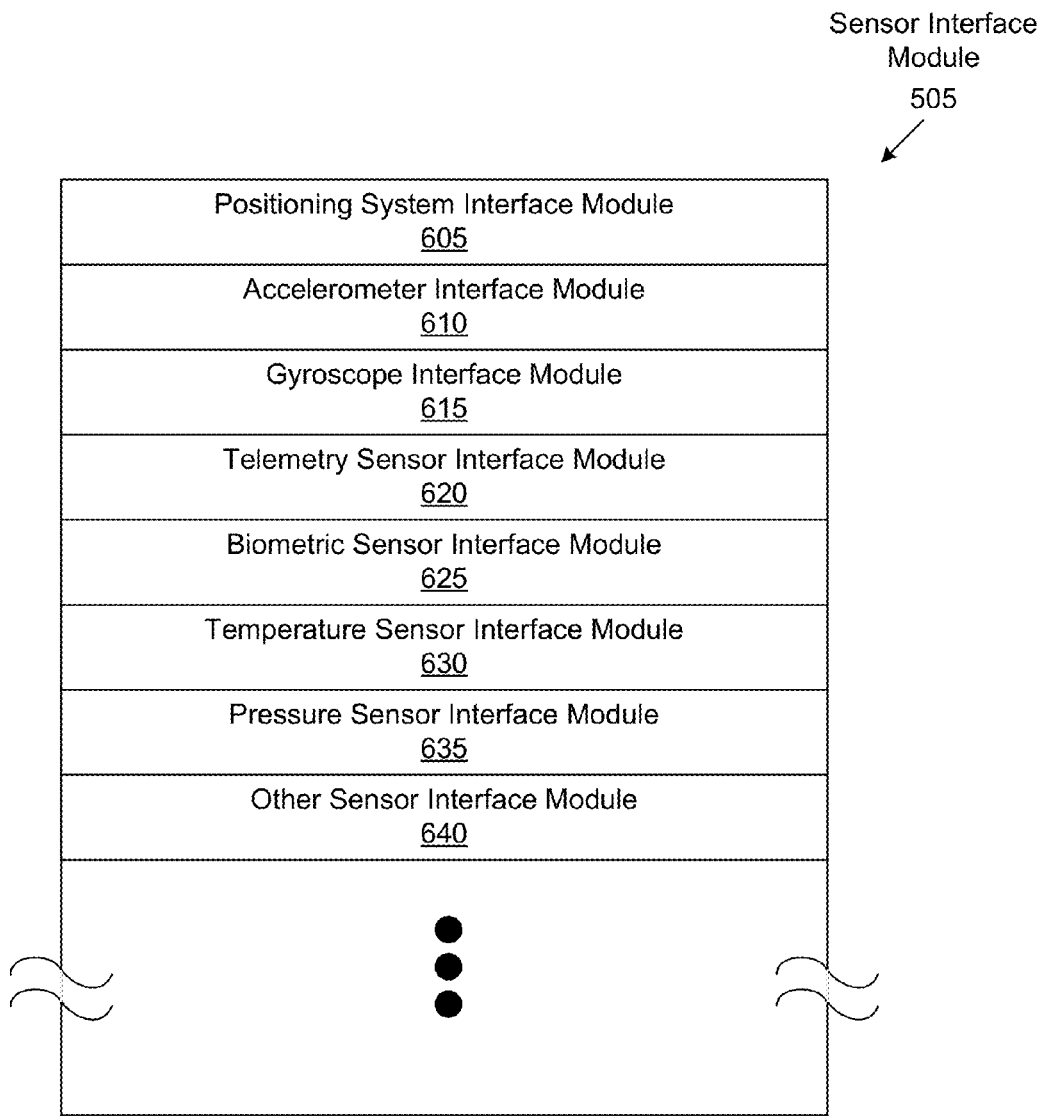
FIG. 6 depicts an example of a sensor interface module, according to some embodiments.

The sensor interface module 505 may contain hardware, software, and/or firmware operative to interface with the sensors 115, shown in FIG. 1. In various embodiments, the sensor interface module 505 may receive sensor data (i.e., actual sensor data) from the sensors 115. The sensor interface module 505 may also provide instructions to activate, deactivate, calibrate, and/or control any number of the sensors 115 (e.g., based on instructions from the trigger server 125). FIG. 6 shows the sensor interface module 505 in greater detail.

The activity recording device interface module 510 may contain hardware, software, and/or firmware operative to interface with the activity recording device 105, shown in FIG. 1. In various embodiments, the activity recording device interface module 510 may receive any number of recordings from the activity recording device 105. The activity recording device interface module 510 may store all or part of the recordings of activities on the activity management system 120 and/or other digital devices (e.g., the trigger server 125 or a third-party cloud storage system). In some embodiments, the activity recording device interface module 510 may receive recording metadata from the activity recording device 105.

The trigger server interface module 515 may contain hardware, software, and/or firmware operative to interface with the trigger server 125 through the network 110, shown in FIG. 1. The trigger server interface module 515 may provide the trigger server 125 contexts for recordings (e.g., the context being received from the user or determined by the activity management system 120) and/or sensor data taken contemporaneously with recordings. The trigger server interface module 515 may also receive from the trigger server 125 tags, flags, marks, and/or annotations to mark or otherwise flag events in recordings and other data.

The recording management module 520 may contain hardware, software, and/or firmware operative to manage activity recordings. In some embodiments, the recording management module 520 may manage storage and/or access to recordings of activities. The recording management module 520 may allow a user to cut portions from, edit, modify, or otherwise manipulate recordings (e.g., based on the tags, flags, marks and/or annotations from the trigger server 125). In some embodiments, the recording management module 520 may create an edited recording. The edited recording may, in various embodiments, comprise highlights of events in a recording of an activity. The edited recording may include enhancements from the enhancement module 525, as discussed herein. In various embodiments, the recording management module 520 may also allow a user to post, publish, email, tweet, or otherwise share recordings with others.

Figure 8:
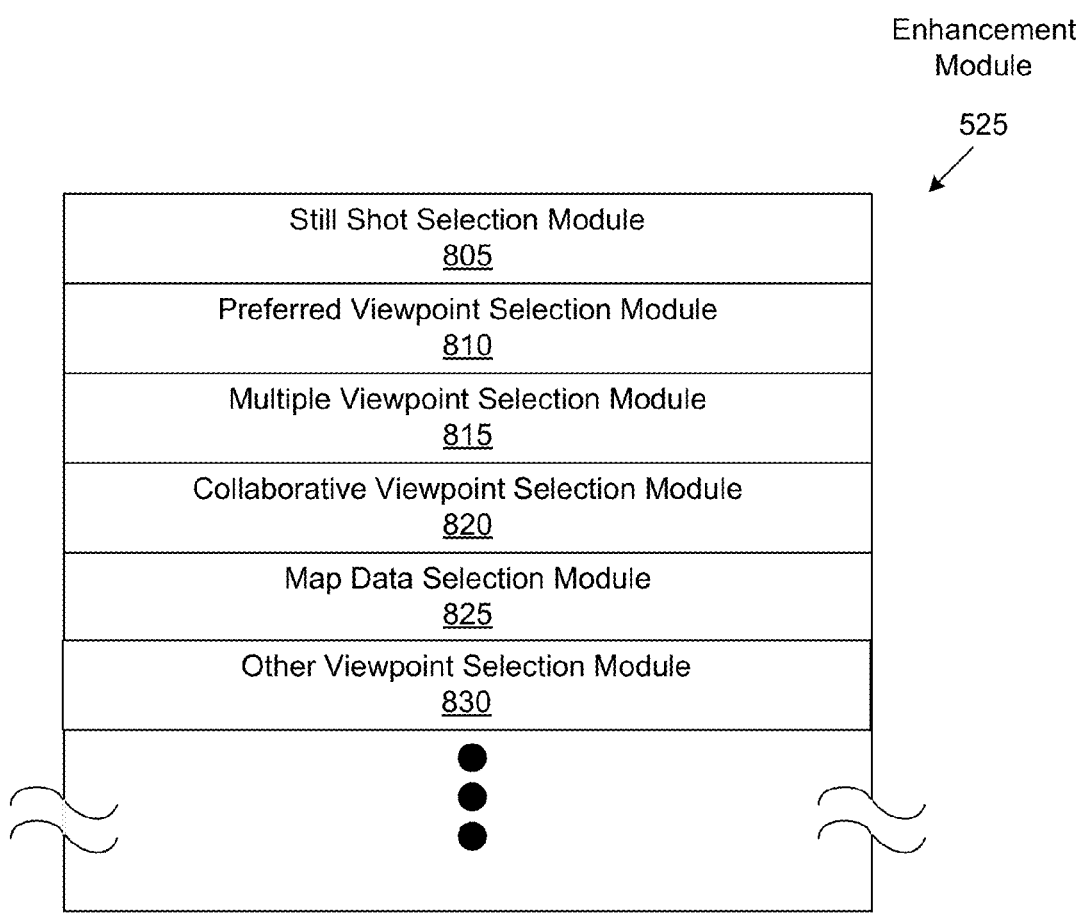
FIG. 8 depicts an example of an enhancement module, according to some embodiments.

The enhancement module 525 may contain hardware, software, and/or firmware operative to enhance recordings. In various embodiments, the enhancements may include one or more of: edited transitions between portions of recordings, annotations (e.g., added text or other images or information to portions of video from recordings), still shots, preferred viewpoints, multiple viewpoints, collaborative viewpoints, map data associated with an event, and other viewpoints. FIG. 8 shows the enhancement module 525 in greater detail.

Those skilled in the art will appreciate that all or part of the activity management system 120 may be a part of the activity recording device 105 (e.g., the activity recording device 105 includes a processor and memory capable of performing any number of the functions of the activity management system 120). Similarly, all or part of the activity management system 120 may be a part of any number of sensors 115.

FIG. 6 depicts an example of a sensor interface module 505, according to some embodiments. The sensor interface module 505 may include a positioning system interface module 605, an accelerometer interface module 610, a gyroscope interface module 615, a telemetry sensor interface module 620, a biometric sensor interface module 625, a temperature sensor interface module 630, a pressure sensor interface module 635, and another sensor interface module 640.

The positioning system interface module 605 may include hardware, software, and/or firmware operative to capture data from a positioning system, such as a GPS system. In some embodiments, the positioning system interface module 605 may receive one or more GPS coordinates of the activity recording device 105. The GPS system may also provide, in some embodiments, longitude, latitude, elevation, and/or other coordinates.

The accelerometer interface module 610 may include hardware, software, and/or firmware operative to capture data from an accelerometer associated with the activity recording device 105 and/or one or more sensor(s) 115. In various embodiments, the accelerometer interface module 610 may capture acceleration of the activity recording device 105 and/or one or more sensor(s) 115 during a recording by the recording device 105.

The gyroscope interface module 615 may include hardware, software, and/or firmware operative to capture angle or tilt information from a gyroscope associated with the activity recording device 105 and/or one or more sensor(s) 115. In various embodiments, the gyroscope interface module 615 may capture angle or tile information of the activity recording device 105 and/or one or more sensor(s) 115 during a recording by the recording device 105.

The telemetry sensor interface module 620 may include hardware, software, and/or firmware operative to capture data from cadence or telemetry sensors associated with the activity recording device 105 and/or one or more sensor(s) 115. In various embodiments, the telemetry sensor interface module 620 may capture cadence or telemetry information of the activity recording device 105 and/or one or more sensor(s) 115 during a recording by the recording device 105.

The biometric sensor interface module 625 may include hardware, software, and/or firmware operative to capture data from biometric sensors associated with the activity recording device 105 and/or one or more sensor(s) 115. In various embodiments, the biometric sensor interface module 625 may capture biometric information of a user during a recording by the activity recording device 105.

The temperature sensor interface module 630 may include hardware, software, and/or firmware operative to capture data from temperature sensors associated with the activity recording device 105 and/or one or more sensor(s) 115. In various embodiments, the temperature sensor interface module 630 may capture temperatures near or around the activity recording device 105 and/or one or more sensor(s) 115 during a recording by the activity recording device 105.

The pressure sensor interface module 635 may include hardware, software, and/or firmware operative to may capture data from pressure sensors associated with the activity recording device 105 and/or one or more sensor(s) 115. In various embodiments, the pressure sensor interface module 635 may capture pressures near or around the activity recording device 105 and/or one or more sensor(s) 115 during a recording by the activity recording device 105. The other sensor interface module 640 may capture data from miscellaneous sensors and/or components associated with the activity recording device 105 during an activity.

Figure 7:
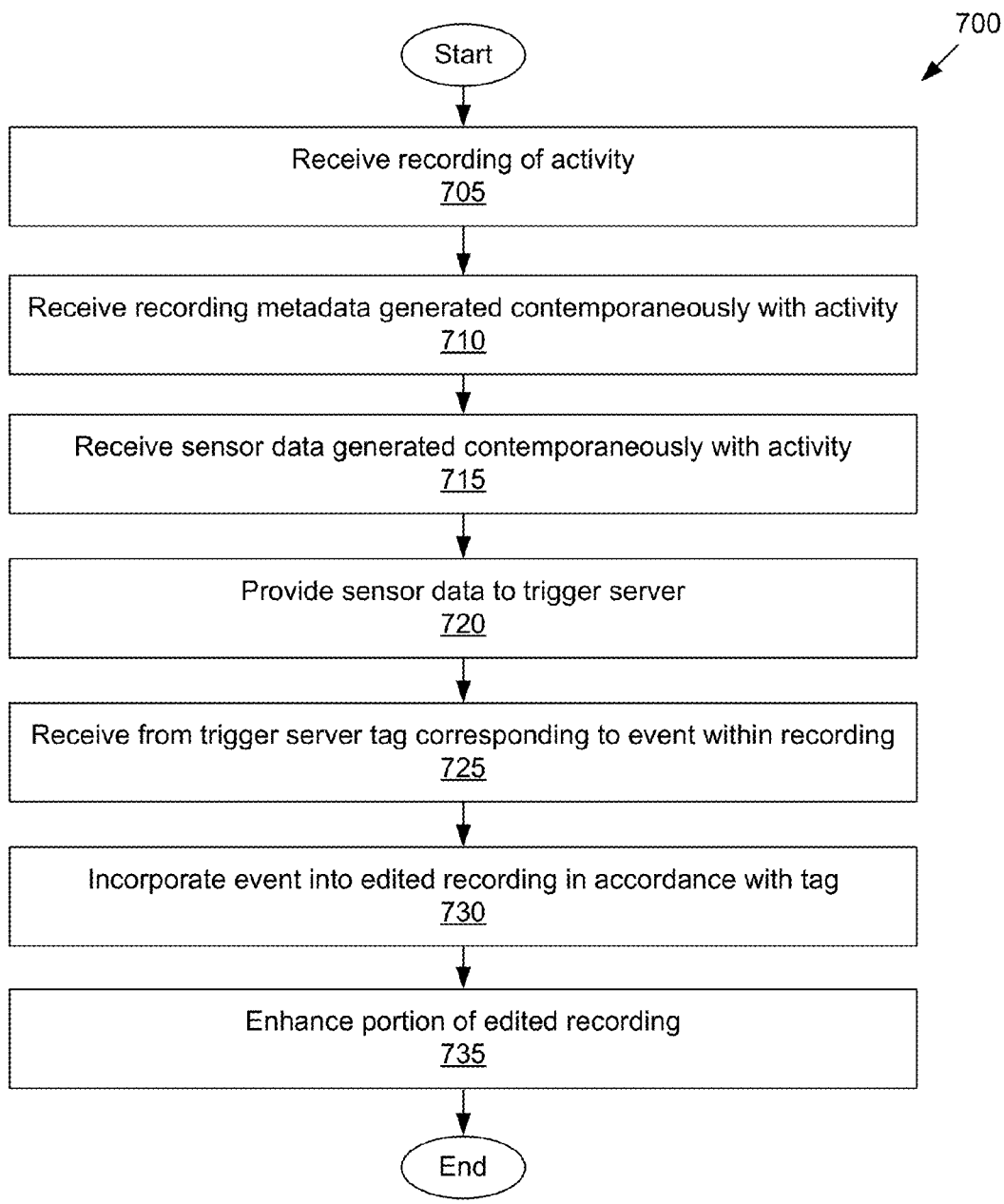
FIG. 7 depicts a flowchart of an exemplary method for enhancing a portion of an edited recording, according to some embodiments.

FIG. 7 depicts a flowchart 700 of an exemplary method for enhancing a portion of an edited recording, according to some embodiments. The flowchart 700 is discussed in conjunction with the activity management system 120, shown in FIG. 5.

In step 705, the activity recording device interface module 510 receives a recording of an activity. The recording may contain one or more events that have been previously tagged. For example, the trigger server 125 may provide a timeline of tags, annotations, and/or marks. The timeline may be correlated with a recording whereby the tags, annotations, and/or marks are associated with events of likely interest in the recording.

In step 710, the activity recording device interface module 510 receives recording metadata generated contemporaneously with recording of the activity. In some embodiments, the activity recording device interface module 510 receives information such as pixel counts, etc. that may indicate the occurrence of one or more events of likely interest.

In step 715, the sensor interface module 505 receives sensor data generated contemporaneously with recording of the activity. In various embodiments, the sensor interface module 505 may obtain sensor data from the any number of sensors 115. In some embodiments, the sensor interface module 505 may obtain sensor data from all of the sensors 115, while in other embodiments; the sensor interface module 505 may obtain sensor data from a subset of activated sensors of the sensors 115.

In some embodiments, the positioning system interface module 605 captures sensor data from a positioning system. In various embodiments, the accelerometer interface module 610 captures sensor data from an accelerometer. The gyroscope interface module 615 may capture angle or tilt sensor information from a gyroscope. Further, the telemetry sensor interface module 620 may capture sensor data from cadence or telemetry sensors. The biometric sensor interface module 625 may capture sensor data from biometric sensors. In various embodiments, the temperature sensor interface module 630 may capture sensor data from temperature sensors. The pressure sensor interface module 635 may capture data from pressure sensors. In some embodiments, other sensor interface module 640 may capture data from other sensors.

In step 720, the trigger server interface module 515 provides the sensor data to the trigger server 125. In embodiments where the trigger server interface module 515 is coupled to the trigger server 125 through the network 110, the trigger server interface module 515 provides the sensor data to the trigger server 125 through the network 110. In embodiments where the trigger server interface module 515 resides on the same device as the trigger server 125, the trigger server interface module 515 may provide the sensor data to the trigger server 125 through the medium coupling the trigger server interface module 515 and the trigger server 125.

In various embodiments, the trigger server interface module 515 may provide all or some sensor data to the trigger server 125. For example, where bandwidth over the network 110 is limited, the trigger server interface module 515 may provide "low bandwidth" sensor data. "Low bandwidth" sensor data may be any sensor data (e.g., accelerometer sensor data) that may be transferred over network 110 when there is little network performance. When bandwidth and/or performance of the network 110 are sufficient, the trigger server interface module 515 may provide additional sensor data including, for example, audio from a microphone.

Those skilled in the art will appreciate that the activity recording device 105 and/or the activity management system 120 may provide portions of recordings, recordings, and/or recording metadata to the trigger server 125. In some embodiments, the activity recording device 105 and/or the activity management system 120 provide portions of recordings (e.g., for sharing), recordings, and/or recording metadata to the trigger server 125 when the network 110 has sufficient performance (e.g., when bandwidth is high).

In various embodiments, the activity recording device 105 and/or the activity management system 120 determine the quality of the network based on the available network connection (e.g., LTE, WiMax, 3G, WiFi, or the like). For example, those who cycle will appreciate that cellular and/or data connectivity may be limited (if available at all) at many points along a trip. When there is no bandwidth, the activity recording device 105, sensors 115, and/or the activity management system 120 may be configured to wait until improved cellular and/or data connectivity before providing past sensor data, present sensor data, past recording metadata, current recording metadata, partial recordings, and/or recordings to a digital device (e.g., the trigger server 125) via the network 110. When there is little or low bandwidth (e.g., the activity recording device 105, sensors 115, and/or the activity management system 120 detects 2G or the network signal strength is below or equal to a low strength threshold), the activity recording device 105, sensors 115, and/or the activity management system 120 may be configured to send some sensor data, some of the: past sensor data, present sensor data, past recording metadata, current recording metadata, partial recordings, and/or recordings to a digital device. In some embodiments, when there is low bandwidth, the activity recording device 105, activity management system 120, and/or sensors 115 provide particular sensor data that may be transmitted over poorly performing networks. For example, the activity recording device 105, activity management system 120, and/or sensors 115 may provide accelerometer sensor data but not audio sensor data which may consume greater bandwidth.

When there is acceptable or high bandwidth (e.g., the activity recording device 105, sensors 115, and/or the activity management system 120 detects 4G or the network signal strength is above or equal to a strength threshold), the activity recording device 105, sensors 115, and/or the activity management system 120 may be configured to send all or most sensor data, including past sensor data, present sensor data, past recording metadata, current recording metadata, partial recordings, and/or recordings to a digital device. In some embodiments, when there is high bandwidth, the activity recording device 105, activity management system 120, and/or sensors 115 provide particular sensor data that may be transmitted over satisfactorily performing or highly performing networks (e.g., a strong WiFi connection).

In step 725, the trigger server interface module 515 may incorporate from the trigger server 125 a tag corresponding to an event within the recording. In some embodiments, the trigger server interface module 515 receives a tag that provides a particular time corresponding to a recorded event in an extended recording. The trigger server interface module 515 may provide the tag to the recording management module 520.

In step 730, the recording management module 520 may incorporate a portion of the recording (marked with one or more flags, tags, or annotations) into an edited recording. In an embodiment, the recording management module 520 determines a time or an interval of time corresponding to the tag. For example, if the tag indicated an event occurred between five minutes (5:00) and five minutes thirty seconds (5:30) in the recording, the recording management module 520 may incorporate a thirty second clip (e.g., which may correspond to an event) into a new or edited recording. In various embodiments, the recording management module 520 may concatenate additional events based on the flags, tags, and/or annotations into the edited recording. The resulting edited recording may include any number of clips or portions of any number of recordings.

Figure 9:
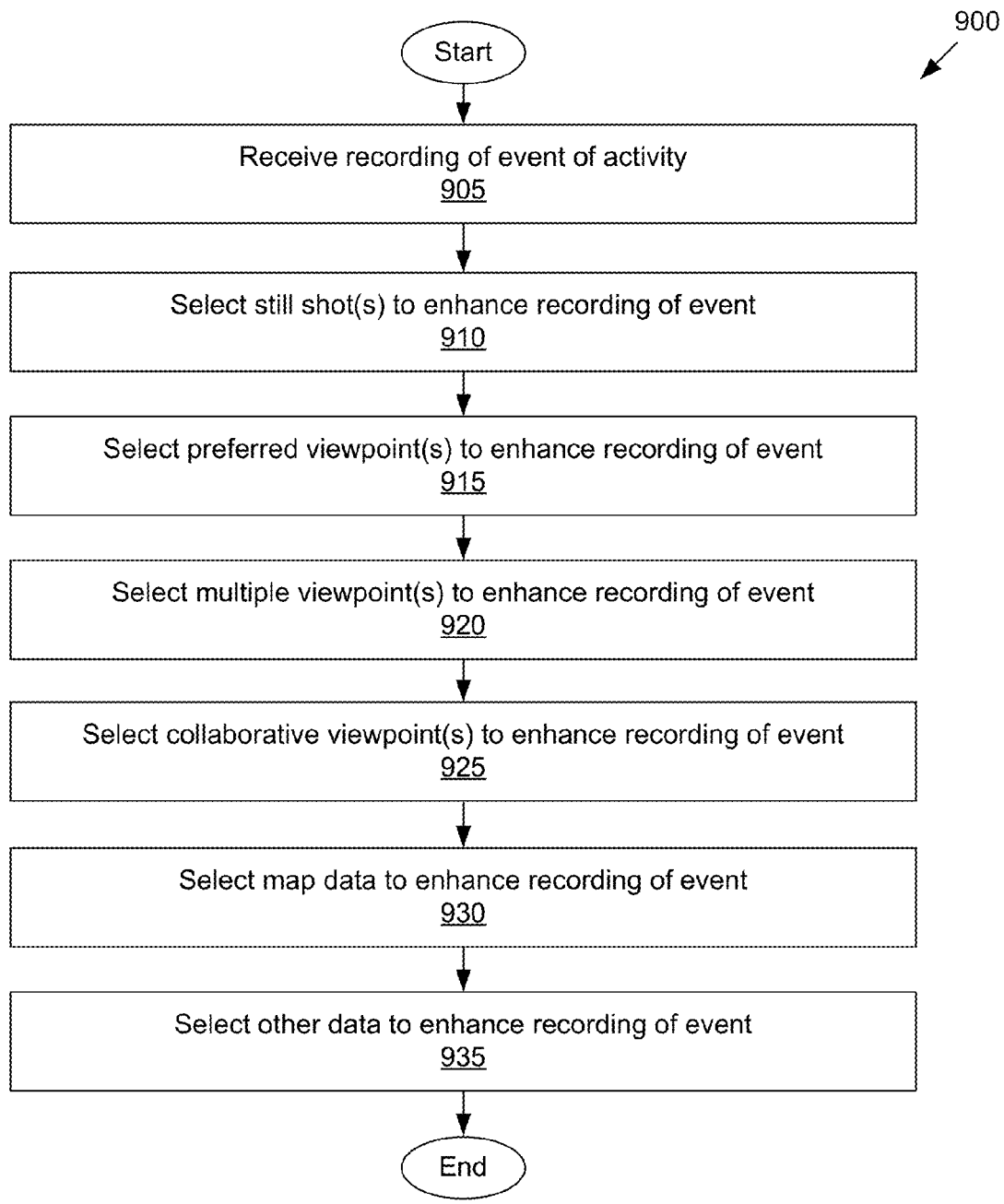
FIG. 9 depicts a flowchart of an exemplary method for selecting an enhancement for an edited recording, according to some embodiments.

In step 735, the enhancement module 525 may enhance a portion of the edited recording. In various embodiments, the enhancement module 525 may select and apply one or more of: still shots, preferred viewpoints, multiple viewpoints, collaborative viewpoints, map data associated with an event, and other viewpoints. FIG. 9 shows various exemplary enhancements that can be applied.

FIG. 8 depicts an example of an enhancement module 525, according to some embodiments. The enhancement module 525 may include a still shot selection module 805, a preferred viewpoint selection module 810, a multiple viewpoint selection module 815, a collaborative viewpoint selection module 820, a map data selection module 825, and another viewpoint selection module 830.

The still shot selection module 805 may select a still shot from a recording to enhance a portion of the footage. In some embodiments, the still shot selection module 805 may contain a library of text, images, memes, and other content. The still shot selection module 805 may select a still shot from the library to enhance the portion of the footage.

The preferred viewpoint selection module 810 may select a preferred viewpoint from a recording to enhance a portion of the footage. The preferred viewpoint may accommodate a preferred lighting, a preferred angle, or a preferred perspective of an event. The preferred viewpoint may further accommodate the actions of a participant may accommodate various aesthetic qualities, in various embodiments.

The multiple viewpoint selection module 815 may select multiple viewpoints from a recording to enhance the portion of the footage. The multiple viewpoint selection module 815 may select the footage from multiple activity recording devices to superimpose onto a common screen that shows an event from multiple perspectives.

The collaborative viewpoint selection module 820 may select collaborative viewpoints from a recording to enhance the portion of the footage. For example, the collaborative viewpoint selection module 820 may select the footage from various users to superimpose onto a common screen that shows an event from the perspective of multiple users. The map data selection module 825 may select map data to apply to enhance the portion of the footage. The other viewpoint selection module 830 may select other data (e.g., audio, sound, etc.) to apply to enhance the portion of the footage.

FIG. 9 depicts a flowchart 900 of an exemplary method for selecting an enhancement for an edited recording, according to some embodiments. The flowchart 900 is discussed in conjunction with the recording management module 520, shown in FIG. 5 and the enhancement module 525, shown in FIG. 8.

In step 905, the recording management module 520 (shown in FIG. 5) may receive a recording of an event of an activity. For a cycling activity, for instance, the recording of the event may be a recording of a start of a ride, meeting a friend, an ascent of a particular hill, reaching a particular landmark, a descent of another hill, the end of a ride, or the like.

In step 910, the still shot selection module 805 may select one or more still shots to enhance the recording of the event. To continue the foregoing cycling example, when a cyclist reaches the particular landmark, the still shot selection module 805 may enhance the recording of the event of the landmark with an image of the landmark. In another example, when the cyclist enters a particular city (e.g., Los Altos), the still shot selection module 805 may select or generate text stating "Entering Los Altos" that is superimposed on the recording of the event.

In step 915, the preferred viewpoint selection module 810 may select a preferred viewpoint to enhance the recording of the event. For example, on a cycle ride in which a cyclist climbs a hill at about sunset, a front-lit shot of the road taken while the cyclist faces one direction may accurately capture the cyclist's actions, while a back-lit shot of the road, taken while the cyclist faces another direction, may most aesthetically capture the sunset. In this example, the preferred viewpoint selection module 810 may select the front-lit shot to appropriately capture the event of the cyclist's ascent over the hill.

In step 920, the multiple viewpoint selection module 815 may select one or more multiple viewpoints (e.g., from different portions of any number of recordings from any number of activity recording devices 105) to enhance the recording of the event. For an aviation activity, for instance, a pilot may have multiple activity recording devices that capture various viewpoints at a given time. When the pilot is landing, the multiple viewpoint selection module 815 may combine onto a single screen other recordings taken contemporaneously from multiple activity recording module devices 105, such as activity recording devices of landing gear, activity recording devices of the cockpit, and activity recording devices recording the pilot's point of view.

In step 925, the collaborative viewpoint selection module 820 may select one or more collaborative viewpoints (e.g., from different portions of any number of recordings from any number of activity recording devices 105) to enhance the recording of the event. To continue a foregoing cycling example, on a cycle ride, multiple people (including participants and non-participants) may record a recording with different activity recording device. The collaborative viewpoint selection module 820 may combine, superimpose, or replace portions of recordings to best capture an event. As another example, at a baseball game, a spectator may have recorded a video of a home run being hit. The collaborative viewpoint selection module 820 may capture the hit from multiple viewpoints, such as the viewpoints of other spectators at the baseball game.

In step 930, the map data selection module 825 may select map data to enhance the recording of the event. For instance, on a cycle ride, a participant may traverse a particular geographic region. The map data selection module 825 may provide map data (e.g., an image or a route on a map) corresponding to the regions the participant traverses. At block 935, the other viewpoint selection module 830 may select other data to enhance the recording of the event.

Figure 10:
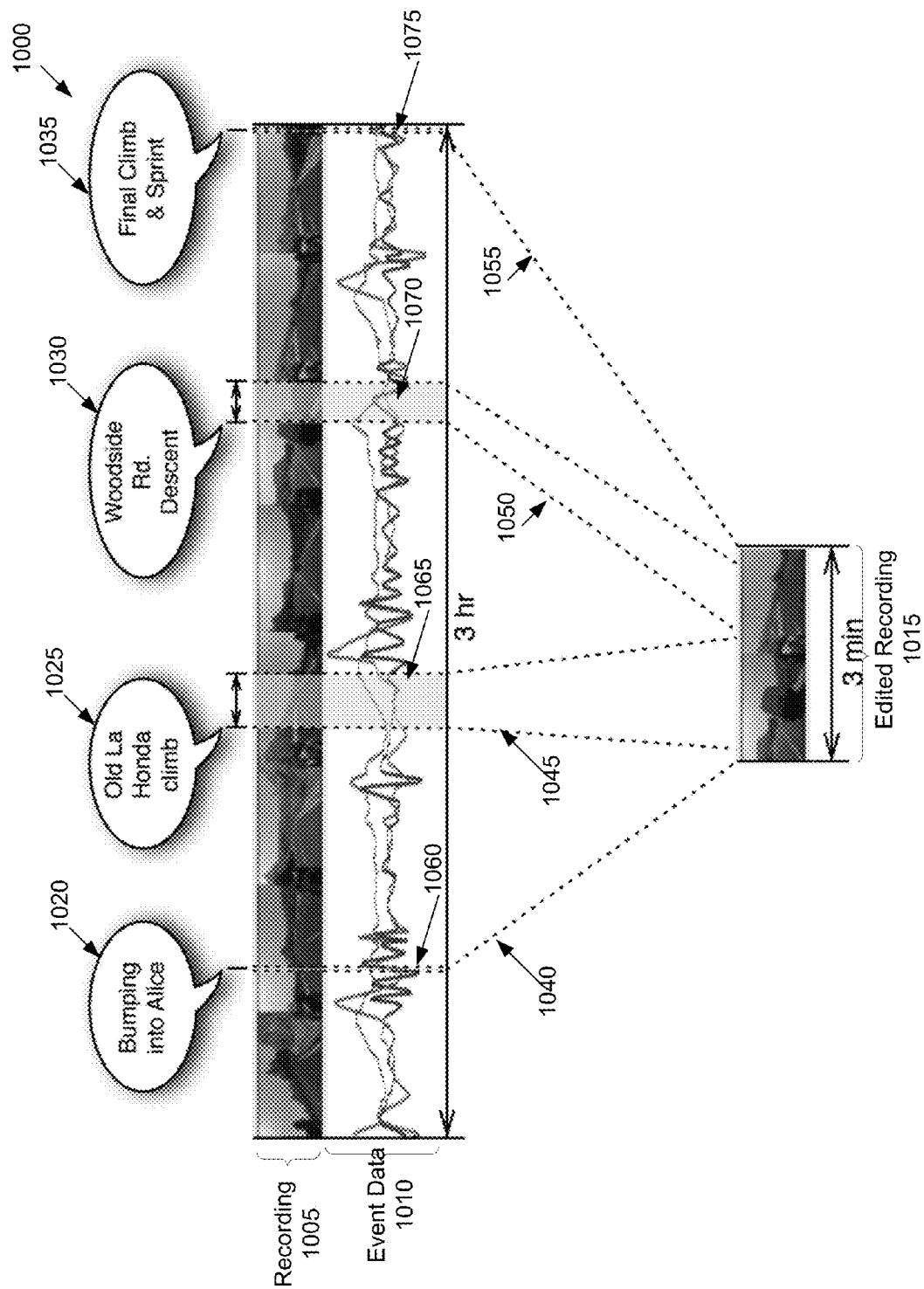
FIG. 10 depicts an exemplary screen showing an edited recording of a cycle ride, according to some embodiments.

FIG. 10 depicts an exemplary screen 1000 showing an edited recording of a cycle ride, according to some embodiments. The screen 1000 includes a recording 1005 of an activity, sensor data 1010, and an edited recording 1015.

The recording 1005 may include video of an activity. In some embodiments, the recording 1005 may have been captured by the activity recording device 105, shown in FIG. 1. In the depicted embodiment of FIG. 10, the activity shown by the recording 1005 includes a cycle ride through a known route in Northern California. In various embodiments, the activity recording device 105 may capture the recording 1005. Those skilled in the art will appreciate that the recording 1005 may include audio and/or enhancements (e.g., annotations such as words, text, shapes, special effects and/or metadata).

The recording 1005 may include depictions a first event 1020, a second event 1025, a third event 1030, and a fourth event 1035. The first event 1020, the second event 1025, the third event 1030, and the fourth event 1035 may contain action, dramatic, or other elements corresponding to highlights of the cycle ride. For instance, the first event 1020 may include bumping into a friend named "Alice" during the cycle ride. The first event 1020 may be significant for social reasons. The second event 1025 may include a climb up a hill on a road named "Old La Honda Road." The third event 1030 may include a descent down a hill on a road named "Woodside Road." The fourth event may include a final climb and sprint at the end of the cycle ride. The second event 1025, the third event 1030, and the fourth event 1035 may record the cyclist travelling at interesting speeds, interesting angles, or interesting scenery, for instance.

Each of the events may be flagged, tagged, and/or annotated based on actual sensor data and/or recording metadata. For example, the first event 1020 of bumping into a friend named "Alice" may be identified as potentially interesting based on actual sensor data such as a sudden stop in acceleration, detection of speaking, periods of sensor inactivity, a manual flag entered by the user, or the like. The second, third, and/or fourth event(s) may be identified as potentially interesting based on sensor data from an accelerometer, gyroscope, GPS, or the like.

In some embodiments, the recording 1005 may also include depictions of uneventful items. The uneventful items may appear repetitive or may not contain the action elements or dramatic elements that characterize the first event 1020, the second event 1025, the third event 1030, and the fourth event 1035. For instance, the uneventful items may depict the cyclist's ride over repetitive stretches of road for relatively long durations (e.g., forty-five minutes). During these stretches, the scenery may not change for extended durations of time. Further, the cyclist may not meet anyone, nor may the cyclist travel particularly fast or at interesting angles.

The sensor data 1010 may include data captured by sensors contemporaneously with the recording 1005 More specifically, in this example, the sensor data 1010 includes first sensor data 1060, second sensor data 1065, third sensor data 1070, and fourth sensor data 1075. In some embodiments, the first sensor data 1060, the second sensor data 1065, the third sensor data 1070, and the fourth sensor data 1075 may have been captured by the sensors 115 (shown in FIG. 1) contemporaneously with the recording 1005. In various embodiments, the sensors 115 may configure sensors to capture the sensor data 1010 based on instructions from the activity management system 120 and/or the trigger server 125. In some embodiments, the activity management system 120 and/or the trigger server 125 may have instructed the sensors 115 to capture the sensor data 1010 based on the fact that a cycling context was identified.

The first sensor data 1060 may represent sensor data captured by the sensor interface module 505 (shown in FIGS. 5 and 6) contemporaneously with the first event 1020. For instance, the other sensor interface module 840 (shown in FIG. 8) may indicate the cyclist is near his friend Alice. The second sensor data 1065 may represent sensor data captured by the sensor interface module 505 contemporaneously with the second event 1025. More specifically, the positioning system interface module 605 (shown in FIG. 6) and the gyroscope interface module 615 (shown in FIG. 6) may indicate the cyclist is moving at a particular velocity and is at a particular tilt characterizing a significant ascent. Moreover, the biometric sensor interface module 625 (shown in FIG. 6) may indicate the cyclist's heartbeat is significantly rising during the ascent signified by the second event 1025.

The third sensor data 1070 may represent sensor data captured by the sensor interface module 505 contemporaneously with the third event 1030. More specifically, the positioning system interface module 605 and the gyroscope interface module 615 may indicate the cyclist is moving at a particular velocity and is at a particular tilt that characterized a significant descent. Moreover, the biometric sensor interface module 625 may indicate the cyclist's heartbeat is significantly rising due to an adrenaline rush during the descent signified by the third event 1030. The fourth sensor data 1075 may represent sensor data captured by the sensor interface module 505 contemporaneously with the fourth event 1035. More specifically, the positioning system interface module 605 and the gyroscope interface module 615 may indicate the cyclist is moving at a particular velocity and is at a particular tilt that characterized a final climb and sprint. Moreover, in this example, the other sensor interface module 640 may indicate the cyclist is in the process of a final climb and sprint.

In some embodiments, the sensors 115 may provide the sensor data 1010 to the trigger server 125, through the network 110 and/or the activity management system 120. The trigger server 125 may determine whether the sensor data 1010 satisfies trigger conditions for a cycling context, as discussed in context of FIG. 4. In various embodiments, the trigger server 125 may determine that each of the first sensor data 1060, the second sensor data 1065, the third sensor data 1070, and the fourth sensor data 1075 satisfies trigger conditions for the cycling context.

In specific embodiments, the trigger server 125 may tag portions of a timeline associated with the recording 1005 to indicate the presence of events at times corresponding to each of the first sensor data 1060, the second sensor data 1065, the third sensor data 1070, and the fourth sensor data 1075. For instance, the trigger server 125 may tag a timeline associated with the recording 1005 with a first tag 1040 corresponding to the time of the first event 1020, second tag 1045 corresponding to the time of the second event 1025, a third tag 1050 corresponding to the time of the third event 1030, and fourth tag 1055 corresponding to the time of the fourth event 1035. The trigger server 125 may provide the first tag 1040, the second tag 1045, the third tag 1050, and the fourth tag 1055 to the activity management system 120. In various embodiments, the tags may be provided when the recording 1005 is uploaded to the activity management system 120 or when the activity recording device 105 is capturing the recording 1005.

In various embodiments, the activity management system 120 may create the edited recording 1015 from the recording 1005 based on the first tag 1040, the second tag 1045, the third tag 1050, and the fourth tag 1055. The first tag 1040, the second tag 1045, the third tag 1050, and the fourth tag 1055 may correspond, respectively, to the first event 1020, the second event 1025, the third event 1030, and the fourth event 1035. In this example, the edited recording 1015 includes a consolidated clip of: the encounter with the cyclist's friend Alice, a dramatic climb up Old La Honda Road to highlight the cyclist's tenacity riding up a steep hill, an action-packed clip of a fast decent down Woodside Road to showcase the cyclist's ability to handle high speeds through curvy roads, and the cyclist's final climb up a hill and descent. The resulting edited recording 1015 is rich with drama and action. At three minutes long, the edited recording 1015 is also much shorter than the recording 1005, which, in this example, is three hours long. Moreover, the edited recording 1015 may also be enhanced with still images, preferred viewpoints, multiple viewpoints, collaborative viewpoints, map data, and other data that would not necessarily be reflected in the recording 1005. Advantageously, the edited recording 1015 may have been generated by the activity management system 120 based on sensor data from the sensors 115 and tags from the trigger server 125 without manual search, editing, or other intervention, by the cyclist.

Figure 11:
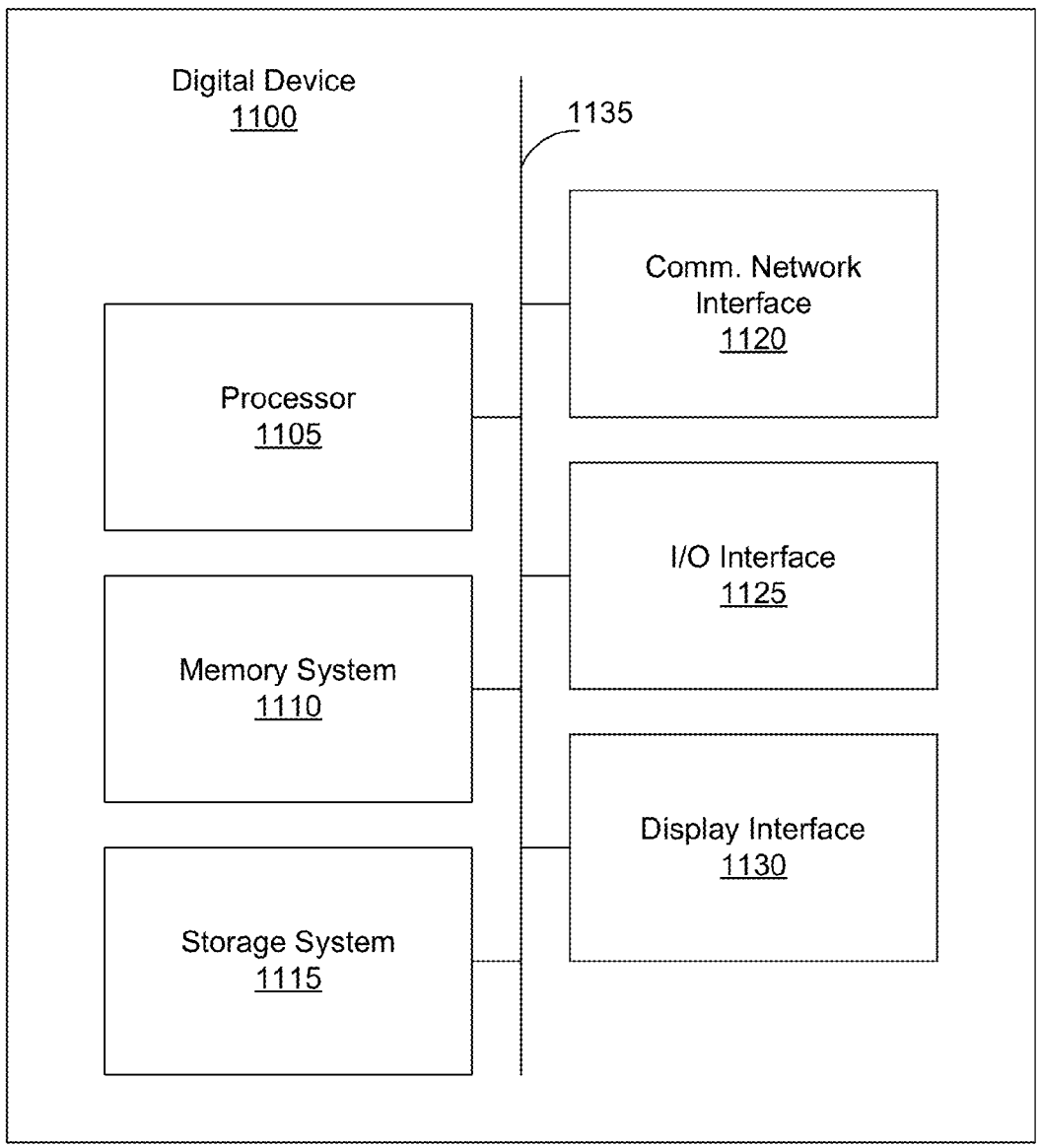
FIG. 11 depicts an exemplary digital device, according to some embodiments.

FIG. 11 depicts an exemplary digital device 1100, according to some embodiments. The digital device 1100 comprises a processor 1105, a memory system 1110, a storage system 1115, a communication network interface 1120, an I/O interface 1125, and a display interface 1130 communicatively coupled to a bus 1135. The processor 1105 may be configured to execute executable instructions (e.g., programs). In some embodiments, the processor 1105 comprises circuitry or any processor capable of processing the executable instructions.

The memory system 1110 is any memory configured to store data. Some examples of the memory system 1110 are storage devices, such as RAM or ROM. The memory system 1110 may comprise the RAM cache. In various embodiments, data is stored within the memory system 1110. The data within the memory system 1110 may be cleared or ultimately transferred to the storage system 1115.

The storage system 1115 is any storage configured to retrieve and store data. Some examples of the storage system 1115 are flash drives, hard drives, optical drives, and/or magnetic tape. In some embodiments, the digital device 1100 includes a memory system 1110 in the form of RAM and a storage system 1115 in the form of flash data. Both the memory system 1110 and the storage system 1115 comprise computer readable media which may store instructions or programs that are executable by a computer processor including the processor 1105.

The communication network interface (com. network interface) 1120 may be coupled to a data network via the link 1140. The communication network interface 1120 may support communication over an Ethernet connection, a serial connection, a parallel connection, or an ATA connection, for example. The communication network interface 1120 may also support wireless communication (e.g., 802.11a/b/g/n, WiMAX, LTE, 3G, 2G). It will be apparent to those skilled in the art that the communication network interface 1120 may support many wired and wireless standards.

The optional input/output (I/O) interface 1135 is any device that receives input from the user and output data. The display interface 1130 is any device that may be configured to output graphics and data to a display. In one example, the display interface 1130 is a graphics adapter.

It will be appreciated by those skilled in the art that the hardware elements of the digital device 1100 are not limited to those depicted in FIG. 11. A digital device 1100 may comprise more or less hardware elements than those depicted. Further, hardware elements may share functionality and still be within various embodiments described herein. In one example, encoding and/or decoding may be performed by the processor 1105 and/or a co-processor located on a GPU.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A system comprising:
   a trigger creation module configured to provide a set of one or more trigger conditions, satisfaction of each trigger condition being based on sensor data to be received, the set of trigger conditions created prior to occurrence of an activity to be recorded and satisfaction of which causing recorded portions of one or more events that occur during the activity and that correspond to actual sensor data received during the activity to be included automatically in an edited version of a recording of the activity;
   a sensor data module configured to receive the actual sensor data from one or more sensors, the actual sensor data being generated substantially contemporaneously with recording of the activity;
   a trigger satisfaction module configured to determine whether at least one trigger condition of the set of trigger conditions has been satisfied based on the actual sensor data, and to identify a potentially interesting event within the recording of the activity based on the satisfied at least one trigger condition, and
   editing module to edit the recording of the activity to create the edited version of the recording that includes the potentially interesting event automatically due to the actual sensor data satisfying the set of trigger conditions.

2. The system of claim 1, wherein the trigger satisfaction module is configured to compare the actual sensor data to at least one sensor data threshold associated with the at least one trigger condition of the set of trigger conditions.

3. The system of claim 1, further comprising a tagging module configured to tag a portion of the recording associated with the potentially interesting event.

4. The system of claim 1, further comprising a sensor configuration module configured to activate the one or more sensors in response to the trigger creation module providing the set of the one or more trigger conditions.

5. The system of claim 1, further comprising a context identification module configured to identify a context, wherein:
   the trigger creation module is configured to identify the set of one or more trigger conditions from a plurality of trigger conditions based at least in part on the context.

6. The system of claim 1, wherein the trigger satisfaction module is configured to determine whether the at least one trigger condition has been satisfied based on actual recording metadata.

7. The system of claim 6, wherein the actual recording metadata comprises a pixel count of at least a portion of the recording of the activity.

8. The system of claim 1, wherein the sensor data to be received comprises one or more of: Global Positioning System (GPS) sensor data, compass data, accelerometer data, gyroscope data, biometric sensor data, thermometer data, pressure sensor data, RF data, Geiger counter data, and telemetry sensor data.

9. The system of claim 1, wherein the one or more sensors are incorporated into a mobile phone.

10. The system of claim 9, wherein the mobile phone is wirelessly coupled to an activity recording device configured to take the recording of the activity.

11. A method comprising:
    providing a trigger including a set of one or more trigger conditions, satisfaction of each trigger condition being based on sensor data to be received, the set of trigger conditions created prior to occurrence of an activity to be recorded and satisfaction of which causing recorded portions of one or more events that occur during the activity and that correspond to actual sensor data received during the activity to be included automatically in an edited version of a recording of the activity;
    receiving the actual sensor data from one or more sensors, the actual sensor data being generated substantially contemporaneously with recording of the activity;
    determining whether at least one trigger condition of the set of trigger conditions has been satisfied based on the actual sensor data;
    identifying a potentially interesting event within the recording of the activity based on the satisfied at least one trigger condition; and
    editing the recording of the activity to create the edited version of the recording that includes the potentially interesting event automatically due to the actual sensor data satisfying the set of trigger conditions.

12. The method of claim 11, wherein determining whether the trigger has been satisfied comprises comparing the actual sensor data to at least one sensor data threshold associated with the at least one trigger condition of the set of trigger conditions.

13. The method of claim 11, further comprising tagging a portion of the recording associated with the potentially interesting event.

14. The method of claim 11, further comprising activating the one or more sensors in response to a trigger creation module providing the set of the one or more trigger conditions.

15. The method of claim 11, further comprising identifying a context; wherein:
    the set of one or more trigger conditions is identified from a plurality of trigger conditions based at least in part on the context.

16. The method of claim 11, wherein determining whether the at least one trigger condition has been satisfied is based on actual recording metadata.

17. The method of claim 16, wherein the actual recording metadata comprises a pixel count of at least a portion of the recording of the activity.

18. The method of claim 11, wherein the sensor data to be received comprises one or more of: Global Positioning System (GPS) sensor data, compass data, accelerometer data, gyroscope data, biometric sensor data, thermometer data, pressure sensor data, RF data, Geiger counter data, and telemetry sensor data.

19. The method of claim 11, wherein the one or more sensors are incorporated into a mobile phone.

20. The method of claim 19, wherein the mobile phone is wirelessly coupled to an activity recording device configured to take the recording of the activity.

21. A system comprising:
    means for providing a set of one or more trigger conditions, satisfaction of each trigger condition being based on sensor data to be received, the set of trigger conditions created prior to occurrence of an activity to be recorded and satisfaction of which causing recorded portions of one or more events that occur during the activity and that correspond to actual sensor data received during the activity to be included automatically in an edited version of a recording of the activity;

means for receiving the actual sensor data from one or more sensors, the actual sensor data being generated substantially contemporaneously with recording of the activity;

means for determining whether at least one trigger condition of the set of trigger conditions has been satisfied based on the actual sensor data;

means for identifying a potentially interesting event within the recording of the activity based on the satisfied at least one trigger condition; and means for editing the recording of the activity to create the edited version of the recording that includes the potentially interesting event automatically due to the actual sensor data satisfying the set of trigger conditions.

\* \* \* \* \*